United States Patent
Mahlmeister et al.

(10) Patent No.: US 11,666,824 B2
(45) Date of Patent: *Jun. 6, 2023

(54) METHODS, SYSTEMS, AND DEVICES FOR DYNAMICALLY APPLYING EQUALIZER PROFILES

(71) Applicant: STEELSERIES ApS, Copenhagen SV (DK)

(72) Inventors: Jeffrey Nicholas Mahlmeister, Glenview, IL (US); Thane Kurt Woidan, Chicago, IL (US); Thomas J. Panfil, La Grange, IL (US); Tino Soelberg, Chicago, IL (US)

(73) Assignee: STEELSERIES ApS, Copenhagen SV (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/501,571

(22) Filed: Oct. 14, 2021

(65) Prior Publication Data
US 2022/0143500 A1     May 12, 2022

Related U.S. Application Data

(63) Continuation of application No. 16/678,909, filed on Nov. 8, 2019, now Pat. No. 11,173,397.
(Continued)

(51) Int. Cl.
*A63F 13/497* (2014.01)
*A63F 13/79* (2014.01)
(Continued)

(52) U.S. Cl.
CPC ........ *A63F 13/497* (2014.09); *A63F 13/5378* (2014.09); *A63F 13/79* (2014.09);
(Continued)

(58) Field of Classification Search
CPC ..................................................... A63F 13/497
See application file for complete search history.

(56) References Cited

U.S. PATENT DOCUMENTS 6,425,827 B1   7/2002  Nimura
8,279,051 B2  10/2012  Khan
(Continued)

OTHER PUBLICATIONS

"Fortnite Battle Royale—Replay System", https://www.epicgames.com/fortnite/en-US/news/fortnite-battle-royale-replay-system, Apr. 11, 2018, 5 pages.

*Primary Examiner* — Seng H Lim
(74) *Attorney, Agent, or Firm* — Guntin & Gust, PLC; Atanu Das

(57) ABSTRACT

A system that incorporates the subject disclosure may include, for example, an embodiment for detecting a map associated with a gaming session for a video game executing on a computing device associated with a first user, and obtaining a map equalizer profile associated with the map for the video game. Further embodiments can include determining a first avatar, associated with the first user, is located within a first environment of the map for the video game, and obtaining a first environment equalizer profile associated with the first environment. Additional embodiments can include providing first instructions to the computing device associated with the first user according to the map equalizer profile and the first environment equalizer profile. The first instructions indicate to the computing device to adjust audio output of the video game according to the map equalizer profile and the first environment equalizer profile. Additional embodiments are disclosed.

20 Claims, 20 Drawing Sheets

Related U.S. Application Data

(60) Provisional application No. 62/758,069, filed on Nov. 9, 2018.

(51) Int. Cl.

| | | |
|---|---|---|
| *A63F 13/5378* | (2014.01) | |
| *A63F 13/86* | (2014.01) | |
| *A63F 13/798* | (2014.01) | |
| *A63F 13/28* | (2014.01) | |
| *A63F 13/98* | (2014.01) | |
| *A63F 13/95* | (2014.01) | |
| *A63F 13/843* | (2014.01) | |
| *A63F 13/355* | (2014.01) | |
| *A63F 13/85* | (2014.01) | |
| *H04L 51/046* | (2022.01) | |
| *H04L 51/10* | (2022.01) | |
| *A63F 13/54* | (2014.01) | |
| *A63F 13/69* | (2014.01) | |
| *A63F 13/35* | (2014.01) | |
| *G06N 20/00* | (2019.01) | |
| *H04L 67/06* | (2022.01) | |
| *A63F 13/847* | (2014.01) | |
| *H04L 51/52* | (2022.01) | |

(52) U.S. Cl.
CPC ........... *A63F 13/798* (2014.09); *A63F 13/86* (2014.09); *A63F 13/28* (2014.09); *A63F 13/35* (2014.09); *A63F 13/355* (2014.09); *A63F 13/54* (2014.09); *A63F 13/69* (2014.09); *A63F 13/843* (2014.09); *A63F 13/847* (2014.09); *A63F 13/85* (2014.09); *A63F 13/95* (2014.09); *A63F 13/98* (2014.09); *A63F 2300/537* (2013.01); *A63F 2300/538* (2013.01); *A63F 2300/558* (2013.01); *A63F 2300/5546* (2013.01); *A63F 2300/634* (2013.01); *G06N 20/00* (2019.01); *H04L 51/046* (2013.01); *H04L 51/10* (2013.01); *H04L 51/52* (2022.05); *H04L 67/06* (2013.01)

(56) References Cited

U.S. PATENT DOCUMENTS

| | | | |
|---|---|---|---|
| 8,487,876 | B2 | 7/2013 | Ikeda et al. |
| 8,577,049 | B2 | 11/2013 | Guntin et al. |
| 9,266,017 | B1 | 2/2016 | Parker et al. |
| 9,566,505 | B2 | 2/2017 | Perry |
| 9,744,452 | B2 | 8/2017 | Miura et al. |
| 9,795,871 | B2 | 10/2017 | Trombetta et al. |
| 9,884,258 | B2 | 2/2018 | Huang et al. |
| 10,237,615 | B1 | 3/2019 | Gudmundsson et al. |
| 10,456,680 | B2 | 10/2019 | Miron et al. |
| 10,603,593 | B2 | 3/2020 | Cox et al. |
| 10,713,543 | B1 | 7/2020 | Skuin et al. |
| 10,873,786 | B2 | 12/2020 | Folse et al. |
| 10,922,534 | B2 | 2/2021 | Zavesky et al. |
| 11,007,445 | B2 | 5/2021 | Schwarz et al. |
| 11,045,727 | B2 | 6/2021 | Mahlmeister et al. |
| 11,071,914 | B2 | 7/2021 | Mahlmeister et al. |
| 11,141,657 | B2 | 10/2021 | Mahlmeister et al. |
| 11,185,786 | B2 | 11/2021 | Mahlmeister et al. |
| 11,260,298 | B2 | 3/2022 | Woidan et al. |
| 11,311,806 | B2 | 4/2022 | Mahlmeister et al. |
| 2004/0143852 | A1 | 7/2004 | Meyers et al. |
| 2004/0224765 | A1 | 11/2004 | Martinez et al. |
| 2004/0229679 | A1 | 11/2004 | Anderson et al. |
| 2006/0035692 | A1 | 2/2006 | Kirby et al. |
| 2007/0047517 | A1 | 3/2007 | Xu et al. |
| 2007/0111774 | A1 | 5/2007 | Okada |
| 2007/0157173 | A1 | 7/2007 | Klein et al. |
| 2007/0185909 | A1 | 8/2007 | Klein et al. |
| 2007/0260687 | A1 | 11/2007 | Rao et al. |
| 2008/0004117 | A1 | 1/2008 | Stamper et al. |
| 2008/0076527 | A1 | 3/2008 | Low et al. |
| 2008/0139301 | A1 | 6/2008 | Holthe |
| 2009/0106670 | A1 | 4/2009 | Berndt et al. |
| 2009/0131177 | A1 | 5/2009 | Pearce |
| 2009/0296959 | A1 | 12/2009 | Bongiovi et al. |
| 2009/0318224 | A1 | 12/2009 | Ealey |
| 2010/0056280 | A1 | 3/2010 | Langan et al. |
| 2010/0120494 | A1 | 5/2010 | Dewaal et al. |
| 2010/0287011 | A1 | 11/2010 | Muchkaev |
| 2011/0009192 | A1 | 1/2011 | Aronzon et al. |
| 2011/0065503 | A1 | 3/2011 | Wolff-Petersen et al. |
| 2011/0107220 | A1 | 5/2011 | Perlman |
| 2011/0281645 | A1 | 11/2011 | Wolfson et al. |
| 2011/0312424 | A1 | 12/2011 | Burckart et al. |
| 2012/0083330 | A1 | 4/2012 | Ocko et al. |
| 2012/0083335 | A1 | 4/2012 | Ocko et al. |
| 2012/0083336 | A1 | 4/2012 | Ocko et al. |
| 2012/0258790 | A1 | 10/2012 | Gomez et al. |
| 2013/0040730 | A1 | 2/2013 | Barclay et al. |
| 2013/0288759 | A1 | 10/2013 | Rom et al. |
| 2014/0128156 | A1 | 5/2014 | Morioka |
| 2014/0143687 | A1 | 5/2014 | Tan et al. |
| 2014/0155171 | A1 | 6/2014 | Laakkonen et al. |
| 2014/0179439 | A1 | 6/2014 | Miura et al. |
| 2014/0228112 | A1 | 8/2014 | Laakkonen et al. |
| 2015/0058709 | A1 | 2/2015 | Zaletel |
| 2015/0099586 | A1 | 4/2015 | Huang et al. |
| 2015/0121230 | A1 | 4/2015 | Kulavik et al. |
| 2015/0131845 | A1 | 5/2015 | Forouhar et al. |
| 2015/0141139 | A1 | 5/2015 | Trombetta et al. |
| 2016/0001183 | A1 | 1/2016 | Harvey et al. |
| 2016/0099901 | A1 | 4/2016 | Allen et al. |
| 2016/0158656 | A1 | 6/2016 | Condrey |
| 2017/0106283 | A1 | 4/2017 | Malyuk et al. |
| 2017/0109122 | A1 | 4/2017 | Schmidt et al. |
| 2017/0113136 | A1 | 4/2017 | Marr et al. |
| 2017/0113143 | A1 | 4/2017 | Marr et al. |
| 2017/0157512 | A1 | 6/2017 | Long et al. |
| 2017/0257414 | A1 | 9/2017 | Zaletel |
| 2017/0282073 | A1 | 10/2017 | Kurabayashi |
| 2018/0021674 | A1 | 1/2018 | Nakayama et al. |
| 2018/0032858 | A1 | 2/2018 | Lucey et al. |
| 2018/0351895 | A1 | 12/2018 | Rathod |
| 2019/0019036 | A1 | 1/2019 | Yoo |
| 2019/0224570 | A1 | 7/2019 | Wolff-petersen et al. |
| 2019/0262724 | A1 | 8/2019 | Trombetta et al. |
| 2019/0270020 | A1 | 9/2019 | Miura et al. |
| 2019/0291008 | A1 | 9/2019 | Cox et al. |
| 2019/0366189 | A1 | 12/2019 | Plant et al. |
| 2020/0037090 | A1 | 1/2020 | Hackl |
| 2020/0061477 | A1 | 2/2020 | Mahlmeister et al. |
| 2020/0134298 | A1 | 4/2020 | Zavesky et al. |
| 2020/0147487 | A1 | 5/2020 | Mahlmeister et al. |
| 2020/0147489 | A1 | 5/2020 | Mahlmeister et al. |
| 2020/0147499 | A1 | 5/2020 | Mahlmeister et al. |
| 2020/0147500 | A1 | 5/2020 | Mahlmeister et al. |
| 2020/0147501 | A1 | 5/2020 | Mahlmeister et al. |
| 2020/0188784 | A1 | 6/2020 | Woidan et al. |
| 2020/0197813 | A1 | 6/2020 | Cox et al. |
| 2020/0230499 | A1 | 7/2020 | Buser et al. |
| 2020/0269136 | A1 | 8/2020 | Gurumurthy et al. |
| 2020/0368616 | A1 | 11/2020 | Delamont |
| 2020/0387817 | A1 | 12/2020 | Kurtz et al. |
| 2020/0406139 | A1 | 12/2020 | Chino |
| 2020/0406140 | A1 | 12/2020 | Sundareson |
| 2021/0031106 | A1 | 2/2021 | Alderman et al. |
| 2021/0394061 | A1 | 12/2021 | Mahlmeister et al. |
| 2022/0111298 | A1 | 4/2022 | Mahlmeister et al. |
| 2022/0152492 | A1 | 5/2022 | Woidan et al. |
| 2022/0266135 | A1 | 8/2022 | Mahlmeister et al. |

METHODS, SYSTEMS, AND DEVICES FOR DYNAMICALLY APPLYING EQUALIZER PROFILES

CROSS-REFERENCE TO RELATED APPLICATION(S)

This application is a Continuation of and claims priority to U.S. patent application Ser. No. 16/678,909, filed Nov. 8, 2019, which claims the benefit of priority to U.S. Provisional Application No. 62/758,069, filed Nov. 9, 2018. The contents of each of the foregoing are hereby incorporated by reference into this application as if set forth herein in full.

FIELD OF THE DISCLOSURE

The present disclosure relates generally to methods, systems, and devices for dynamically applying equalizer profiles.

BACKGROUND

An equalizer (audio) profile includes audio settings for a group of audio frequencies. Further, an equalizer profile can be used by an audio output device such as a headset, speaker, earpiece, etc. to adjust the volume or sound quality of an audible frequency range heard by a user. For example, an equalizer profile can indicate to amplify or dampen the sound for an audio output device for a frequency range. In another example, an equalizer profile can filter a frequency range for an audio output device to reduce an unwanted (ambient) noise to improve sound quality. In a video game, the equalizer settings of an audio output device can be adjusted to specific equalizer profile that is manually provided to the audio output device for the video game to render a particular audio user experience.

BRIEF DESCRIPTION OF THE DRAWINGS

Reference will now be made to the accompanying drawings, which are not necessarily drawn to scale, and wherein.

DETAILED DESCRIPTION

Figure 1:
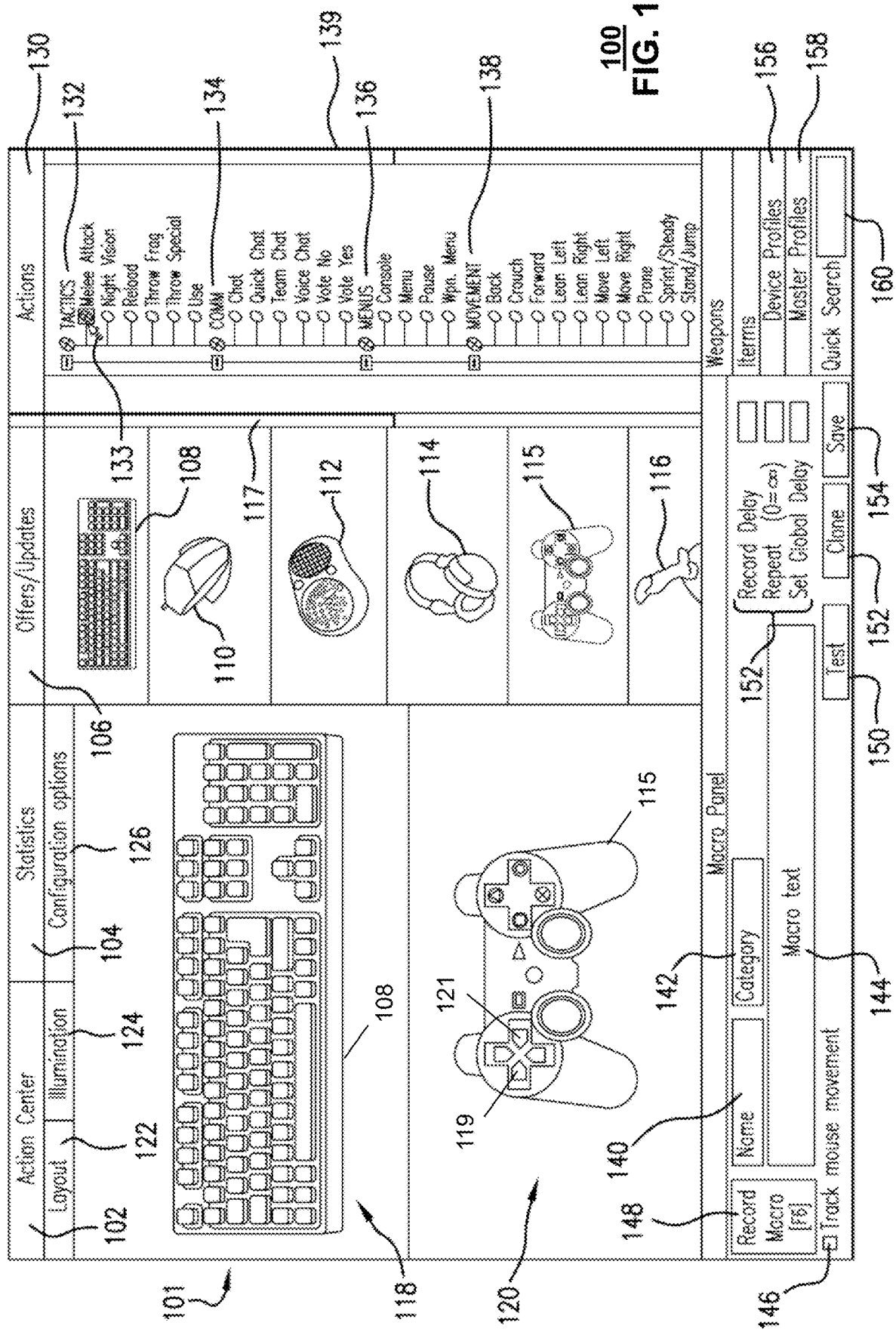
FIG. 1 depicts an illustrative embodiment of a Graphical User Interface (GUI) generated by an Accessory Management Software (AMS) application according to the present disclosure.

The subject disclosure describes, among other things, illustrative embodiments for detecting a map associated with a gaming session for a video game executing on a computing device associated with a first user, and obtaining a map equalizer profile associated with the map for the video game. Further embodiments can include determining a first avatar, associated with the first user, is located within a first environment of the map for the video game, and obtaining a first environment equalizer profile associated with the first environment. Additional embodiments can include providing first instructions to the computing device associated with the first user according to the map equalizer profile and the first environment equalizer profile, wherein the first instructions indicate to the computing device to adjust audio output of the video game according to the map equalizer profile and the first environment equalizer profile. Other embodiments are described in the subject disclosure.

One embodiment of the subject disclosure includes a device, comprising a memory to store instructions, and a processor coupled to the memory, wherein responsive to executing the instructions, the processor performs operations. The operations can include detecting a map associated with a gaming session for a video game executing on a computing device associated with a first user, and obtaining a map equalizer profile associated with the map for the video game. Further operations can include determining a first avatar, associated with the first user, is located within a first environment of the map for the video game, and obtaining a first environment equalizer profile associated with the first environment. Additional operations can include providing first instructions to the computing device associated with the first user according to the map equalizer profile and the first environment equalizer profile, wherein the first instructions indicate to the computing device to adjust audio output of the video game according to the map equalizer profile and the first environment equalizer profile.

One embodiment of the subject disclosure includes a machine-readable storage medium, comprising instructions, wherein responsive to executing the instructions, a processor performs operations. The operations can include detecting a map associated with a gaming session for a video game executing on a computing device associated with a first user, and obtaining a map equalizer profile associated with the map for the video game. Further operations can include determining an event associated with first avatar of the first user, and obtaining an event equalizer profile associated with the event. Additional operations can include providing first instructions to the computing device associated with the first user, according to the map equalizer profile, and the event equalizer profile, wherein the first instructions indicate to the computing device to adjust audio output of the video game according to the map equalizer profile, and the event equalizer profile.

One embodiment of the subject disclosure includes a method. The method can include detecting, by a system comprising a processor, a map associated with a gaming session for a video game executing on a computing device associated with a user, and obtaining, by the system, a map equalizer profile associated with the map for the video game. Further, the method can include determining, by the system, an anomaly of a headset, and obtaining, by the system, a headset equalizer profile based on the anomaly of the headset. In addition, the method can include providing, by the system, first instructions to the computing device associated with the user, according to the map equalizer profile, and the headset equalizer profile, wherein the first instructions indicate to the computing device to adjust audio output of the video game according to the map equalizer profile and the headset equalizer profile.

FIG. 1 depicts an illustrative embodiment of a Graphical User Interface (GUI) generated by an Accessory Management Software (AMS) application according to the present disclosure. The AMS application can be executed by a computing device such as a desktop computer, a laptop computer, a tablet, a server, a mainframe computer, a gaming console, a gaming accessory, or any combination or portions thereof. The AMS application can also be executed by portable computing devices such as a cellular phone, a personal digital assistant, or a media player. The AMS application can be executed by any device with suitable computing and communication resources.

Figure 2:
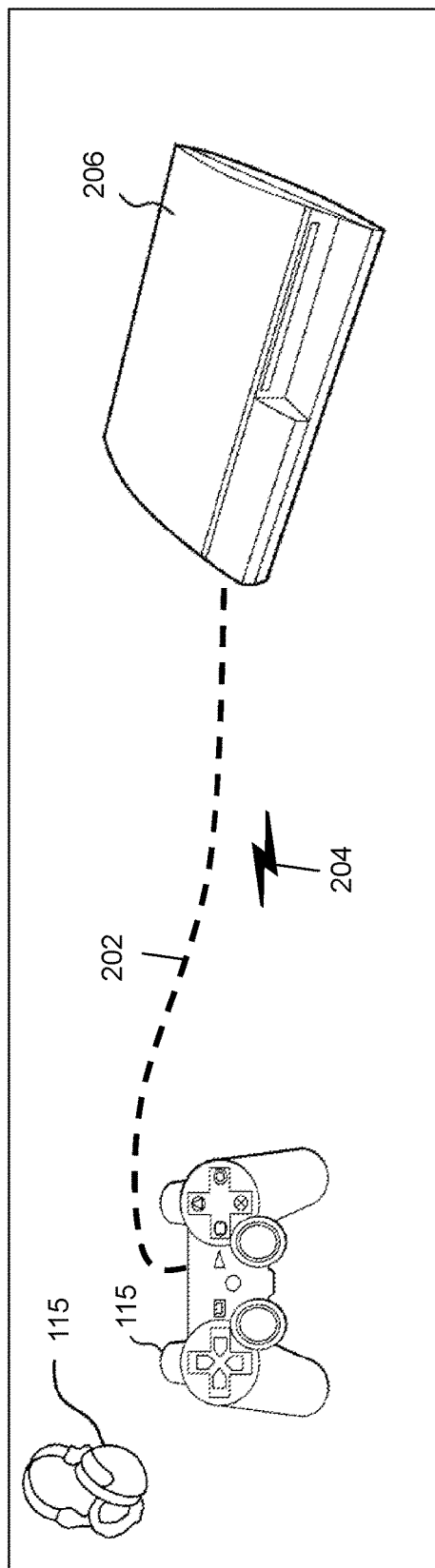
FIGS. 2-3 depict illustrative embodiments for communicatively coupling a gaming controller to a computing device.

FIG. 2 illustrates a number of embodiments for utilizing a gaming controller 115 with a computing device 206 in the form of a gaming console. In the illustration of FIG. 2, the gaming controller 115 can be communicatively coupled to the gaming console 206 with a tethered cable interface 202 such as a USB or proprietary cable, or a wireless interface 204 such as WiFi, Bluetooth, ZigBee, or a proprietary wireless communications protocol. The cable interface 202 provides a means for communication that may be less susceptible to electromagnetic interference. It will be appreciated that the gaming controller 115 may further include a headset 114 (with or without a microphone not shown) utilized by a gamer to communicate with teammates and/or to listen to game sounds in high fidelity. In the illustration of FIG. 2, the AMS application can in whole or in part be executed by the gaming controller 115, the gaming console 206, or a combination thereof.

Figure 3:
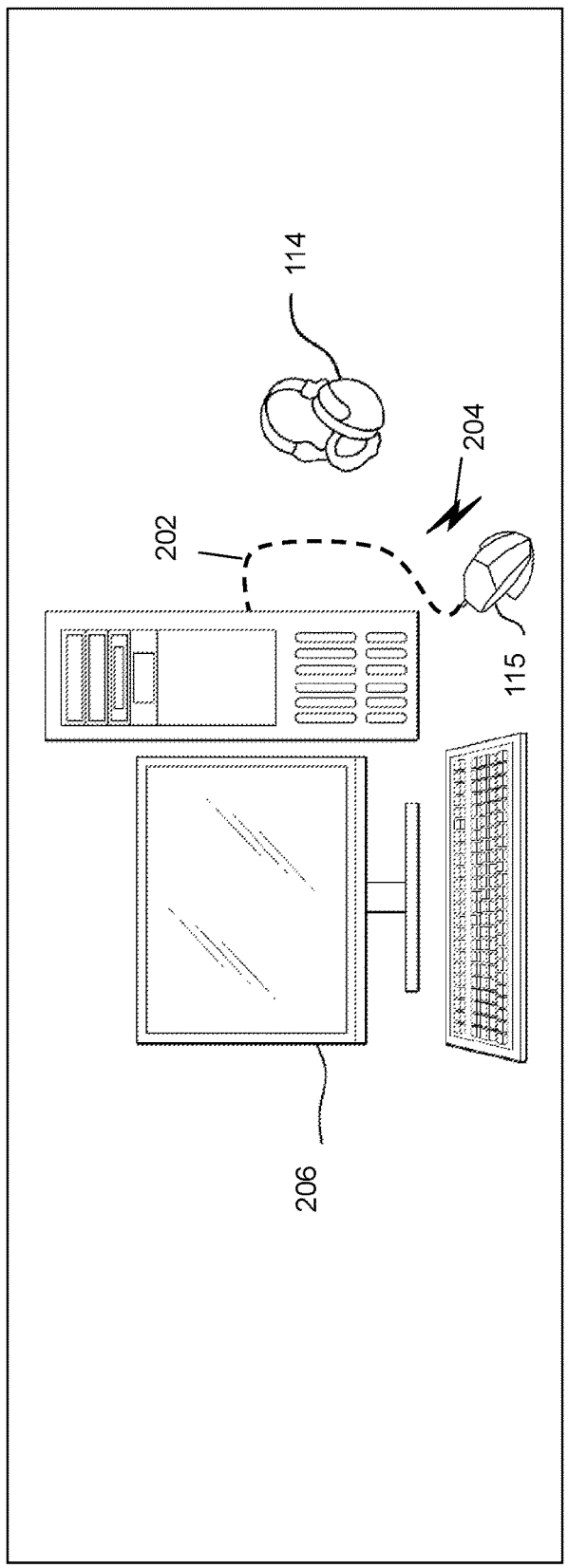

FIG. 3 illustrates a number of other embodiments for utilizing a gaming controller 115 with a computing device 206. In this embodiment, the gaming controller 115 comprises a mouse and the computing device 206 comprises a computer. The gaming controller 115 can be tethered to the computing device 206 by a cable interface 202 (e.g., USB cable or proprietary cable) or a wireless interface 204. The cable interface 202 provides a means for communication that may be less susceptible to electromagnetic interference. It will be appreciated that the gaming controller 115 may further include a headset (with or without a microphone not shown) utilized by a gamer to communicate with teammates and/or to listen to game sounds in high fidelity. In the illustration of FIG. 3, the AMS application can in whole or in part be executed by the gaming controller 115, the gaming console 206, or a combination thereof.

For illustration purposes, the terms gaming console 206 and computer 206 will be used hence forth interchangeably with the term computing device 206 with an understanding that a computing device 206 may represent a number of other devices such as a server, a tablet, a smart phone, and so on. Accordingly, a computing device 206 can represent any device with suitable computing resources to perform the methods described in the subject disclosure.

Figure 4:
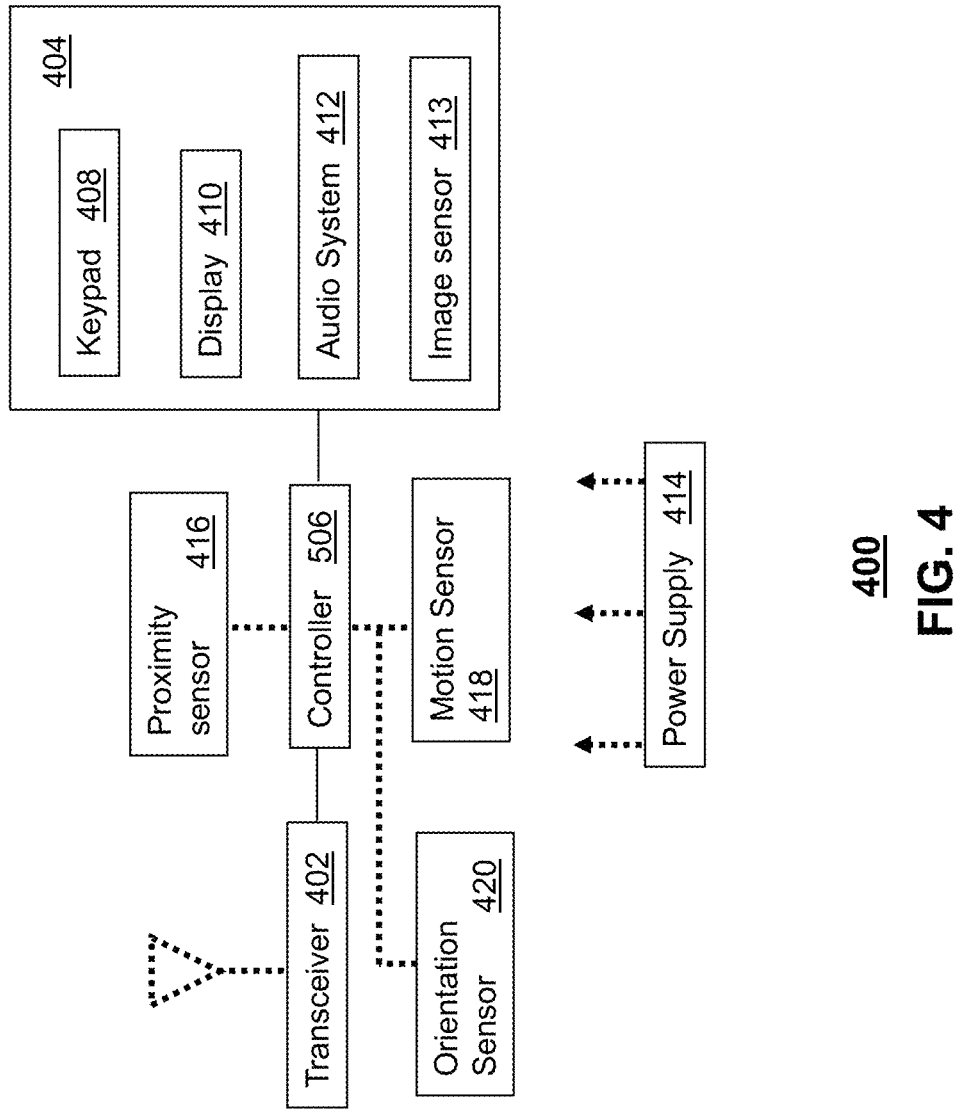
FIG. 4 depicts an illustrative embodiment of a communication device.
Figure 5:
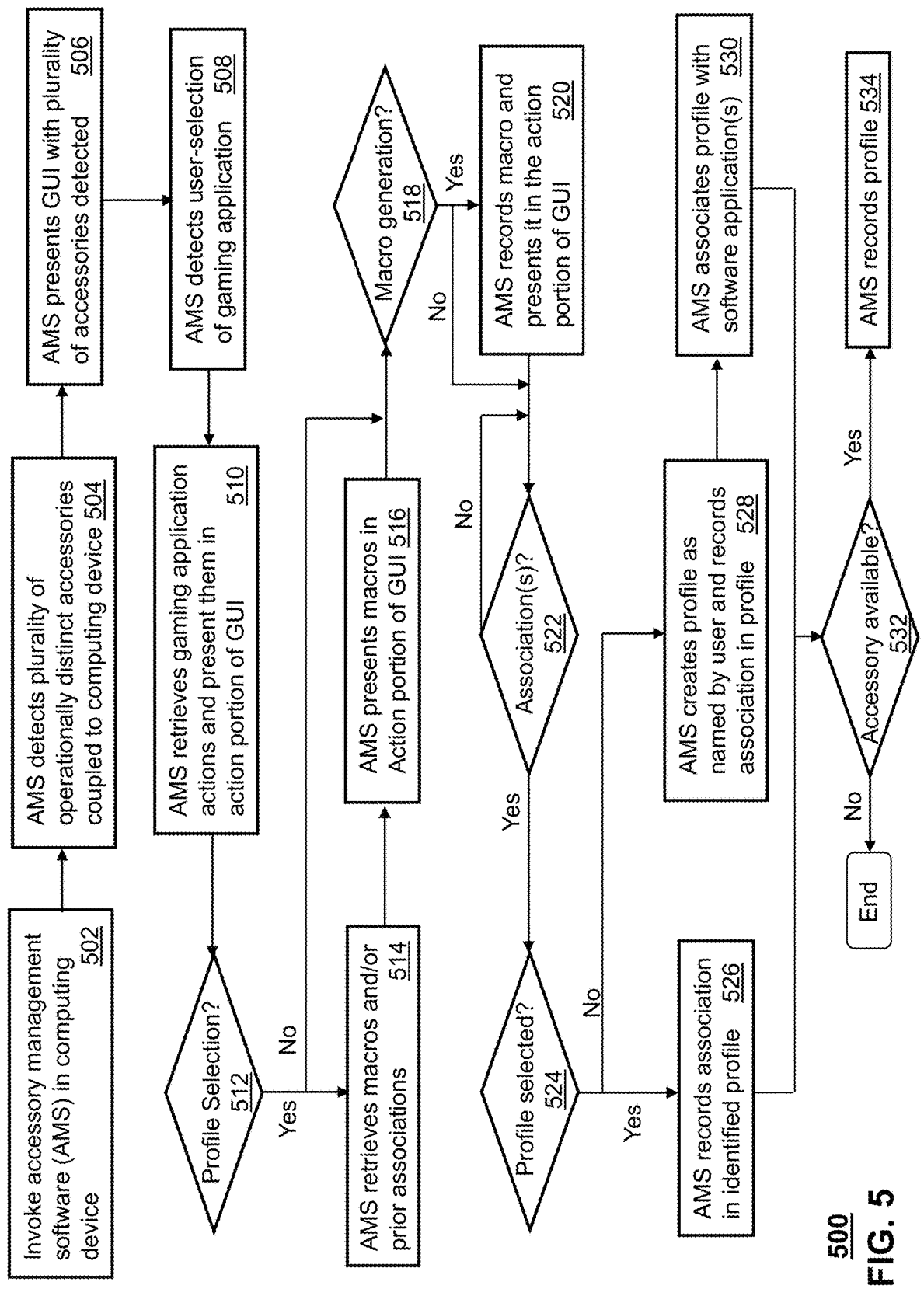
FIG. 5 depicts an illustrative embodiment of a first method utilized in the subject disclosure.

FIG. 4 depicts an illustrative embodiment of a communication device 400. Communication device 400 can serve in whole or in part as an illustrative embodiment of devices described in the subject disclosure. The communication device 400 can comprise a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400.

In an embodiment where the display 410 utilizes touch-sensitive technology, a portion or all of the keypad 408 can be presented by way of the display 410 with navigation features. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as an electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 as described herein can operate with more or less components described in FIG. 4 to accommodate the implementation of devices described by the subject disclosure. These variant embodiments are contemplated by the subject disclosure.

FIGS. 5-7A depict methods 500-700 describing illustrative embodiments of the AMS application. Method 500 can begin with step 502 in which the AMS application is invoked in a computing device. The computing device can be a remote server (not shown), the gaming console 206 or computer 206 of FIGS. 2-3, or any other computing device with suitable computing resources. The invocation step can result from a user selection of the AMS application from a menu or iconic symbol presented by the computing device 206, or when a user communicatively couples a gaming controller 115 or other form of accessory device with the computing device 206. In step 504, the AMS application can detect by way of software drivers in an operating system (OS) of the computing device 206 a plurality of operationally distinct accessories communicatively coupled to the computing device 206. The accessories can be coupled to the computing device 206 by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device 206 (or which can be an integral part of the computing device) and which can control aspects of the OS and/or a software application operating from the computing device 206. An accessory can represent for example a keyboard, a touch screen display, a gaming pad, a gaming controller, a mouse, a joystick, a microphone, or a headset with a microphone—just to mention a few.

In step 506, the AMS application presents a GUI 101 such as depicted in FIG. 1 depicting operationally distinct accessories such as a keyboard 108, and a gaming controller 115. The GUI 101 presents the accessories 108-116 in a scrollable section 117. One or more accessories can be selected by a user with a mouse pointer. In this illustration, the keyboard 108 and the gaming controller 115 were selected for customization. Upon selecting the keyboard 108 and the gaming controller 115 from the scrollable window of section 117, the AMS application presents the keyboard 108 and the gaming controller 115 in split windows 118, 120, respectively, to assist the user during the customization process.

In step 508, the AMS application can be programmed to detect a user-selection of a particular software application such as a video game. This step can be the result of the user entering in a Quick Search field 160 the name of a gaming application (e.g., World of Warcraft™ or WoW). Upon identifying a gaming application, the AMS application can retrieve in step 510 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories being customized in windows 118 and 120 by way of a drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or selectable options of the gaming controller 115 to make an association with an input function of one of these accessories. Actions of one accessory can also be associated with another accessory that is of a different category. For example, key depressions "Ctrl A" of the keyboard 108 can be associated with one of the buttons of the gaming controller 115 (e.g., the left button 119).

In one embodiment, a Melee Attack action can be associated by dragging this action to either the left button 119 or right button 121 of the gaming controller 115. Thus, when the selected button is depressed, the stimulus signal that is generated by the selected button of the gaming controller 115 can be substituted by the AMS application with the Melee Attack action. In another embodiment, the AMS application can be configured so that the Melee Action can be associated with a combination of key button presses (e.g., simultaneous depression of the left and right buttons 119, 121, or a sequence of button depressions: two rapid left button depressions followed by a right button depression).

In yet another embodiment, the AMS application can be configured so that the Melee Action can be associated with movement of the gaming controller 115 such as, for example, rapid movement or shaking of the gaming controller 115. In a further embodiment, the AMS application can be adapted to make associations with two dimensional or three dimensional movements of the gaming controller 115 according to a gaming venue state. For example, suppose the player's avatar enters a fighter jet. In this gaming venue state, moving the left navigation knob forward can be associated by the AMS application with controlling the throttle of the jet engines. Rapidly moving the gaming controller 115 downward can represent release of munitions such as a bomb.

In a gaming venue state where the gamer's avatar has entered a building, lifting of the gaming controller 115 above a first displacement threshold can be associated with a rapid movement of the avatar up one floor. A second displacement threshold can be associated with a rapid movement of the avatar down one floor—the opposite of the first displacement threshold. Alternatively, the second displacement threshold could be associated with a different action such as jumping between buildings when the avatar is on the roof of a building.

The AMS application can monitor gaming venue states by analyzing captured images produced by the gaming application (e.g., one or more still images of a tank, or a video of an avatar entering a tank), and/or by receiving messages from the gaming application by way of an application programming interface (API) thereby enabling the AMS application to identify the occurrence of a particular gaming venue state.

At step 512 the AMS application can also respond to a user selection of a profile. A profile can be a device profile or master profile invoked by selecting GUI button 156 or 158, each of which can identify the association of gaming actions with input functions of one or more accessories. If a profile selection is detected in step 512, the AMS application can retrieve in step 514 macro(s) and/or prior associations defined by the profile. The actions and/or macros defined in the profile can also be presented in step 516 by the AMS application in the actions column 130 of the GUI 101 to modify existing profile associations or create new associations.

In step 518, the AMS application can also respond to a user selection to create a macro. A macro in the present context can mean any actionable command which can be recorded by the AMS application. An actionable command can represent a sequence of stimuli generated by manipulating input functions of an accessory, a combination of actions in the Action section 130, an identification of a software application to be initiated by the OS of the computing device 206, or any other recordable stimulus to initiate, control or manipulate software applications. For instance, a macro can represent a user entering the identity of a software application (e.g., instant messaging tool) to be initiated by the OS upon the AMS application detecting a speech command using speech recognition technology.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a joystick of the gaming controller 115, recordable selections of buttons of the gaming controller 115, and so on. Macros can also be combinations of the above illustrations with selected actions from the Actions 130 menu. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, navigation knob movements of the gaming controller 115, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to modify and thereby customize the timing of one or more stimulations in the stimulation sequence. Once the macro has been fully defined, selection of button 154 records the macro in step 520. The recording step can be combined with a step for adding the macro to the associable items Actions column 130, thereby providing the user the means to associate the macro with input functions of the accessories (e.g., one or more keys of the keyboard 108, buttons of the gaming controller 115, etc.).

In step 522, the AMS application can respond to drag and drop associations of actions with input functions of the keyboard 108 or the gaming controller 115. Associations can also be made based on the two or three dimensional movements of the gaming controller 115. If user input indicates that a user is performing an association, the AMS application can proceed to step 524 where it can determine if a profile has been identified in step 512 to record the association(s) detected. If a profile has been identified, the associations are recorded/stored in the profile in step 526. If a profile has not been identified in step 512, the AMS application can create a profile in step 528 for recording the detected associations. In the same step, the user can name the newly created profile as desired. The newly created profile can also be associated with one or more gaming software applications in step 530 for future reference. The AMS application can also record in a profile in step 526 associations based on gaming venue states. In this embodiment the same stimuli generated by the gaming controller 115 can result in different substitutions based on the gaming venue state detected by the AMS application.

Referring back to step 526, once the associations have been recorded in a profile, the AMS application can determine in step 532 which of the accessories shown illustratively in FIGS. 1-3 are programmable and available for programming. If the AMS application detects that an accessory (e.g., keyboard 108, gaming controller 115) is communicatively coupled to the computing device 206 and determines that the accessory is capable of performing stimulus substitutions locally, the AMS application can proceed to step 534 of FIG. 5 where it submits the profile and its contents for storage in the accessory (e.g., the gaming controller 115 in FIGS. 2-3). Once the accessory (e.g., the gaming controller 115) is programmed with the profile, the accessory can perform stimuli substitutions according to the associations recorded by the AMS application in the profile. Alternatively, the AMS application can store the profile in the computing device 206 of FIGS. 2-3 and perform substitutions of stimuli supplied by the gaming controller 115 according to associations recorded in the profile by the AMS application.

The GUI 101 of FIG. 1 presented by the AMS application can have other functions. For example, the GUI 101 can present a layout of the accessory (button 122), how the accessory is illuminated when associations between input functions and actions are made (button 124), and configuration options for the accessory (button 126). The AMS application can adapt the GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from stimulation information and/or gaming action results captured by the AMS application as described in the subject disclosure. Selecting button 106 can also cause the AMS application to adapt the GUI 101 to present promotional offers and software updates.

The steps of method 500 in whole or in part can be repeated until a desirable pattern is achieved of associations between stimulus signals generated by accessories and substitute stimuli. It would be apparent to an artisan with ordinary skill in the art that there can be numerous other approaches to accomplish the embodiments described by method 500 or variants thereof. These undisclosed approaches are contemplated by the subject disclosure.

Figure 6:
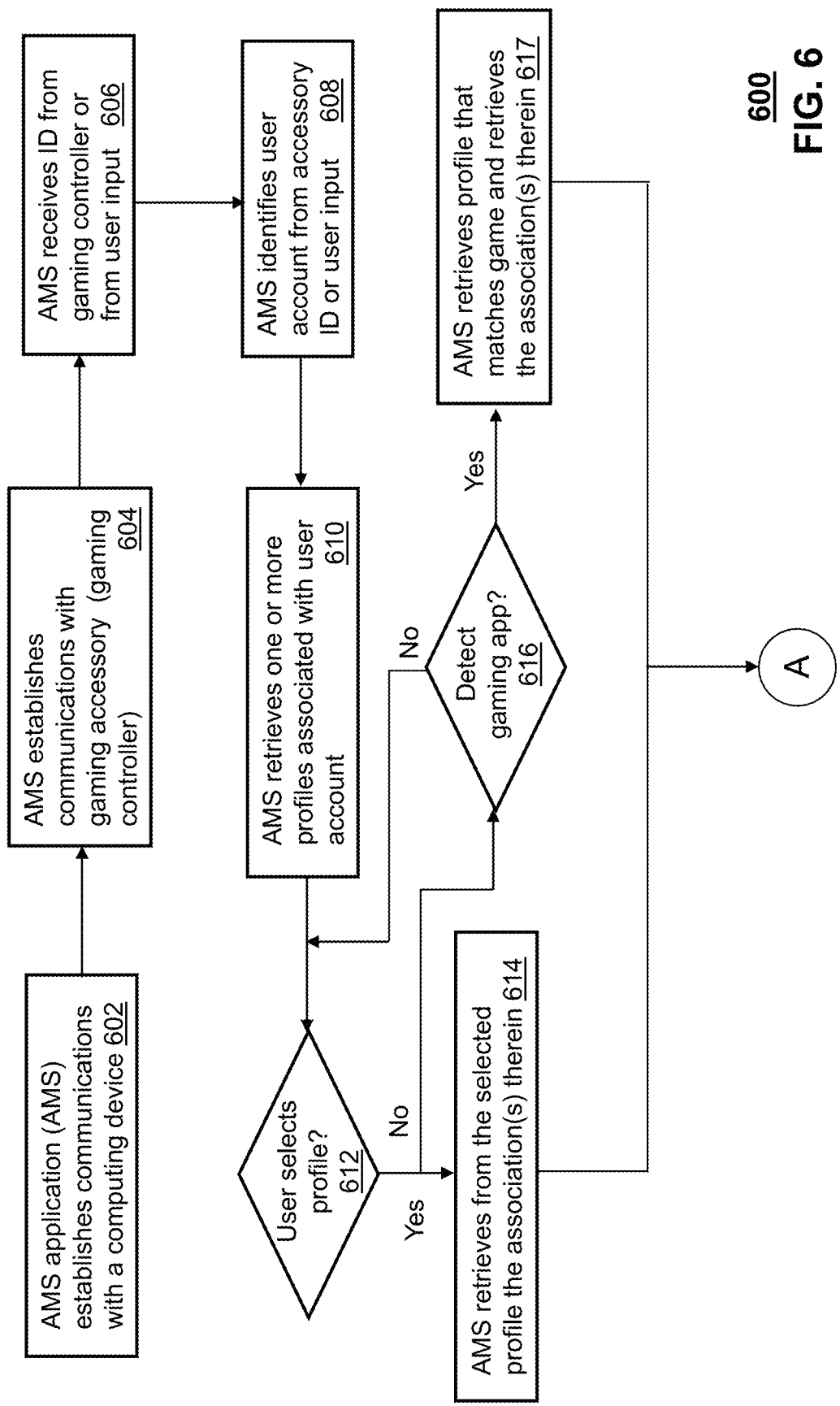
FIG. 6 depicts an illustrative embodiment of a second method utilized in the subject disclosure.

FIG. 6 depicts a method 600 for illustrating additional operations of the AMS application. In the configurations of FIGS. 2-3, the AMS application can be operating in whole or in part from the gaming controller 115, a gaming console 206, a computer 206, or a remote server (not shown). For illustration purposes, it is assumed the AMS application operates from the gaming console 206. Method 600 can begin with the AMS application establishing communications in steps 602 and 604 between the gaming console 206 and a gaming accessory such as the gaming controller 115, and a headset 114 such as shown in FIG. 1. These steps can represent for example a user starting the AMS application from the gaming console 206 and/or the user inserting at a USB port of the gaming console 206 a connector of a USB cable tethered to the gaming controller 115, which invokes the AMS application. In step 606, the gaming controller 115 and/or headset 114 can in turn provide the AMS application one or more accessory ID's, or the user can provide by way of a keyboard or the gaming controller 115 user identification. With the accessory ID's, or user input the AMS application can identify in step 608 a user account associated with the gaming controller 115 and/or headset 114. In step 610, the AMS application can retrieve one or more profiles associated with the user account.

In step 612, the user can be presented by way of a display coupled to the gaming console 206 profiles available to the user to choose from. If the user makes a selection, the AMS application proceeds to step 614 where it retrieves from the selected profiles the association(s) stored therein. If a selection is not made, the AMS application can proceed to step 616 where it can determine whether a software gaming application (e.g., video game) is operating from the gaming console 206 or whether the gaming console 206 is communicating with the software gaming application by way of a remote system communicatively coupled to the gaming console 206 (e.g., on-line gaming server(s) presenting, for example, World of Warcraft™). If a gaming software application is detected, the AMS application proceeds to step 617 where it retrieves a profile that matches the gaming application detected and the association(s) contained in the profile. As noted earlier, association(s) can represent accessory stimulations, navigation, speech, the invocation of other software applications, macros or other suitable associations that result in substitute stimulations. The accessory stimulations can be stimulations that are generated by the gaming controller 115, as well as stimulations from other accessories (e.g., headset 114), or combinations thereof.

Once a profile and its contents have been retrieved in either of steps 614 or step 617, the AMS application can proceed to step 719 of FIG. 7 where it monitors for a change in a gaming venue state based on the presentations made by the gaming application, or API messages supplied by the gaming application. At the start of a game, for example, the gaming venue state can be determined immediately depending on the gaming options chosen by the gamer. The AMS application can determine the gaming venue state by tracking the gaming options chosen by a gamer, receiving an API instruction from the gaming application, or by performing image processing on the video presentation generated by the gaming application. For example, the AMS application can detect that the gamer has directed an avatar to enter a tank. The AMS application can retrieve in step 719 associations for the gaming controller 115 for controlling the tank.

The AMS application can process movements of the gaming controller 115 forwards, backwards, or sideways in two or three dimensions to control the tanks movement. Similarly, rotating the gaming controller 115 or tilting the gaming controller 115 forward can cause an accelerometer, gyro or magnetometer of the gaming controller 115 to provide navigational data to the AMS application which can be substituted with an action to cause the tank to turn and/or move forward. The profile retrieved by the AMS application can indicate that the greater the forward tilt of the gaming controller 115, the greater the speed of the tank should be moving forward. Similarly, a rear tilt can generate navigation data that is substituted with a reverse motion and/or deceleration of the forward motion to stop or slow down the tank. A three dimensional lift of the mouse can cause the tank to steer according to the three dimensional navigation data provided by the gaming controller 115. For example, navigation data associated with a combination of a forward tilt and right bank of the gaming controller 115 can be substituted by the AMS application to cause an increase in forward speed of the tank with a turn to the right determined by the AMS application according to a degree of banking of the gaming controller 115 to the right. In the above embodiment, the three dimensional navigation data allows a gamer to control any directional vector of the tank including speed, direction, acceleration and deceleration.

In another illustration, the AMS application can detect a new gaming venue state as a result of the gamer directing the avatar to leave the tank and travel on foot. Once again the AMS application retrieves in step 719 associations related to the gaming venue state. In this embodiment, selection of buttons of the gaming controller 115 can be associated by the AMS application with weaponry selection, firing, reloading and so on. The movement of the gaming controller 115 in two or three dimensions can control the direction of the avatar and/or selection or use of weaponry. Once the gaming venue state is detected in step 719, the AMS application retrieves the associations related to the venue state, and can perform substitutions of stimuli generated by the gaming controller 115, and/or speech commands received by microphone of the headset 114.

In one embodiment, the AMS application can be configured in step 719 to retrieve a profile that provides substitute stimuli for replacing certain stimuli generated by accessories. The associations recorded in the profile can be venue independent. In another embodiment, the AMS application can retrieve a combination of profiles, where one or more profiles provide substitute stimuli that are venue dependent and one or more other profiles provide substitute stimuli that are venue independent.

The AMS application can monitor in step 720 stimulations generated by the accessories coupled to the gaming console 206. The stimulations can be generated by the gamer by manipulating the gaming controller 115, and/or by generating speech commands detected by a microphone of the headset 114. If a stimulation is detected at step 720, the AMS application can determine in step 722 whether to forward the detected stimulation(s) to an Operating System (OS) of the gaming console 206 or the gaming application directly without substitutions. This determination can be made by comparing the detected stimulation(s) to corresponding associations in one or more profiles retrieved by the AMS application. If the detected stimulation(s) match the associations, then the AMS application proceeds to step 740 where it retrieves substitute stimulation(s) in the profile(s). In step 742, the AMS application can substitute the detected stimulation(s) with the substitute stimulations in the profile(s).

In one embodiment, the AMS application can track in step 744 the substitute stimulations by updating the stimulations with a unique identifier such as a globally unique identifier (GUID). In this embodiment, the AMS application can also add a time stamp to each substitute stimulation to track when the substitution was performed. In another embodiment, the AMS application can track each substitute stimulation according to its order of submission to the gaming application. For instance, sequence numbers can be generated for the substitute stimulations to track the order in which they were submitted to the gaming application. In this embodiment, the substitute stimulations do not need to be updated with sequence numbers or identifiers so long as the order of gaming action results submitted by the gaming application to the AMS application remain in the same order as the substitute stimulations were originally submitted.

For example, if a first stimulation sent to the gaming application by the AMS application is a command to shoot, and a second stimulation sent to the gaming application is a command to shoot again, then so long as the gaming application provides a first a game action result for the first shot, followed by a game action result for the second shot, then the substitute stimulations will not require updating with sequence numbers since the game action results are reported in the order that the stimulations were sent. If on the other hand, the game action results can be submitted out of order, then updating the stimulations with sequence numbers or another suitable identifier would be required to enable the AMS application to properly track and correlate stimulations and corresponding gaming action results.

Referring back to step 722, if the detected stimulation(s) do not match an association in the profile(s), then the AMS application proceeds to one of steps 744 or 746 in order to track the stimulations of the accessory as described above. In another embodiment, tracking of original stimulations or substitute stimulations can be bypassed by skipping steps 744 or 746 and proceeding to step 770 of FIG. 7B.

Figure 7A:
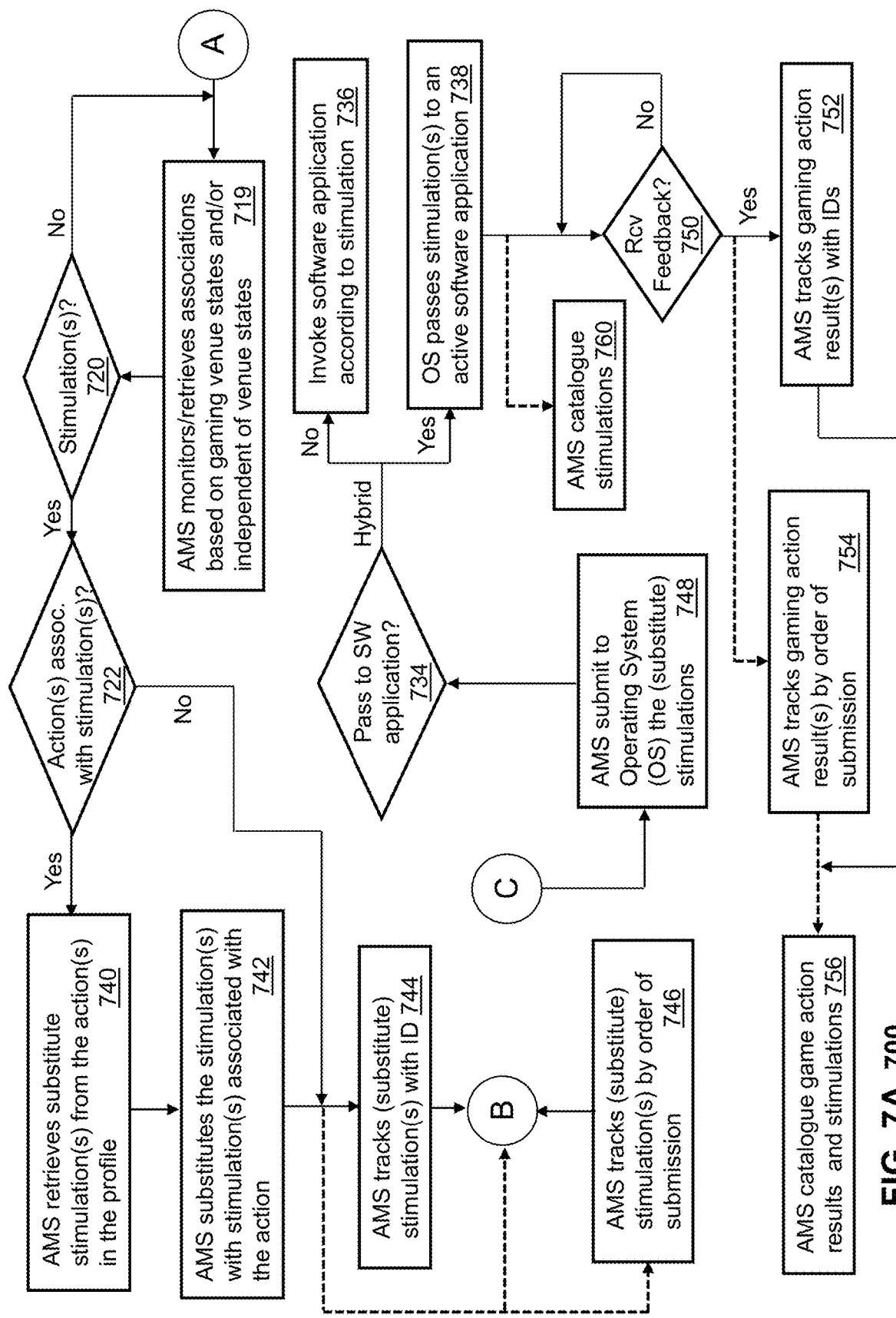
FIG. 7A depicts an illustrative embodiment of a third method utilized in the subject disclosure.
Figure 7B:
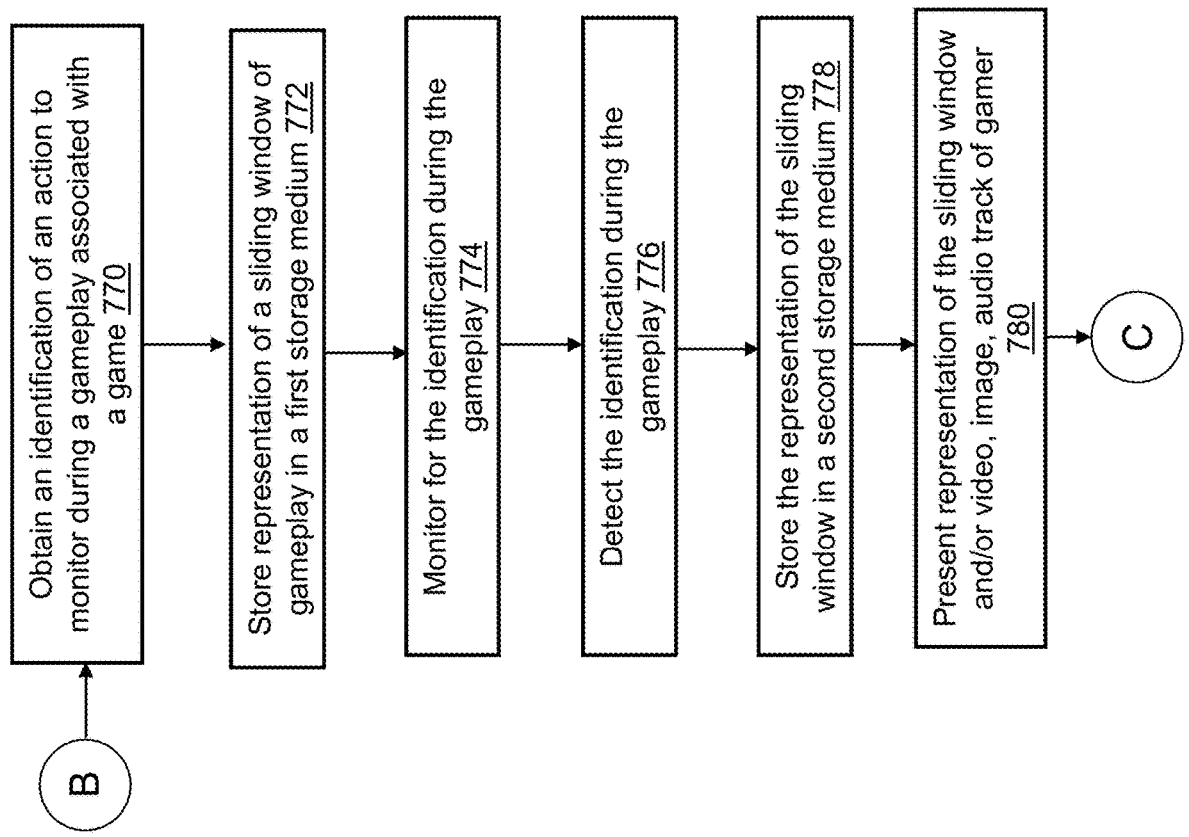
FIG. 7B depicts an illustrative embodiment of a fourth method utilized in the subject disclosure.

Once the stimulations received in step 720 have been substituted with other stimulations at step 742 responsive to a detected association, or maintained unchanged responsive to detecting no association with substitute stimuli, and (optionally) the AMS application has chosen a proper tracking methodology for correlating gaming action results with stimulations, the AMS application can proceed to step 770 of FIG. 7B.

Referring to FIG. 7B, at step 770, the AMS application can obtain an identification of an action to monitor during a gameplay associated with a game. The identification of the action may include a specification of a sound volume level associated with a user (e.g., a gamer). The identification of the action may include a specification of a number of user inputs exceeding a threshold. The number of user inputs may include a number of messages that are submitted, an identification of a content of the messages, an identification of an emoji, or a combination thereof. The identification of an action may include a gaming action provided by the game— see FIGS. 8-9 and accompanying descriptions.

At step 772, the AMS application can store a representation of a sliding window of the gameplay in a first storage medium. The storage of step 772 may occur in real-time during the gameplay. The representation of the sliding window of the gameplay may include a video, an image, an audio track, or a combination thereof. The first storage medium may include a buffer of a graphics card, a random access memory, or a combination thereof.

At step 774, the AMS application can monitor for the identification of the action during the gameplay.

At step 776, the AMS application can detect the identification during the gameplay responsive to the monitoring.

At step 778, the AMS application can store the representation of the sliding window of the gameplay in a second storage medium. The second storage medium may be different from the first storage medium. The second storage medium may include a server associated with a social media platform, a server associated with a virtual machine, a memory contained within a common housing as the first storage medium, or a combination thereof.

The storing of step 778 may include storing a video of a gamer, an image of the gamer, an audio track of the gamer, or a combination thereof.

The storing of step 778 may include presenting a prompt (potentially responsive to the monitoring of step 774), placing a copy of the representation of the sliding window of the gameplay in a third storage medium (which may be different from the first storage medium and/or the second storage medium), receiving a user input in response to the prompt, and storing the copy in the second storage medium responsive to the user input.

In some embodiments, the placing of the copy of the representation of the sliding window of the gameplay in the third storage medium may include initiating a timer to store a second sliding window of the representation after detecting the action, thereby resulting in an updated representation of the sliding window of the gameplay, and responsive to detecting an expiration of the timer, storing the updated representation in the third storage medium. A length of the timer may be based on a user input.

In some embodiments, the storing of step 778 may include storing a new representation of the sliding window of the gameplay in the first storage medium during the gameplay after placing the copy in the third storage medium; in some embodiments, the storage of the new representation may coincide with a step that is separate from step 778.

At step 780, the AMS application may present (e.g., simultaneously present) the representation of the sliding window and/or the video, image, and/or audio track of the gamer, or a combination thereof.

One or more of the steps shown in conjunction with FIG. 7B may be executed more than once. For example, subsequent to storing the representation of the sliding window of the gameplay in the second storage medium as part of step 778, a second representation of the sliding window of the gameplay may be stored in the first storage medium (as part of a second execution of step 772). The storing of the second representation of the sliding window of the gameplay may overwrite at least a portion of the representation of the sliding window of the gameplay in the first storage medium.

Figure 7C:
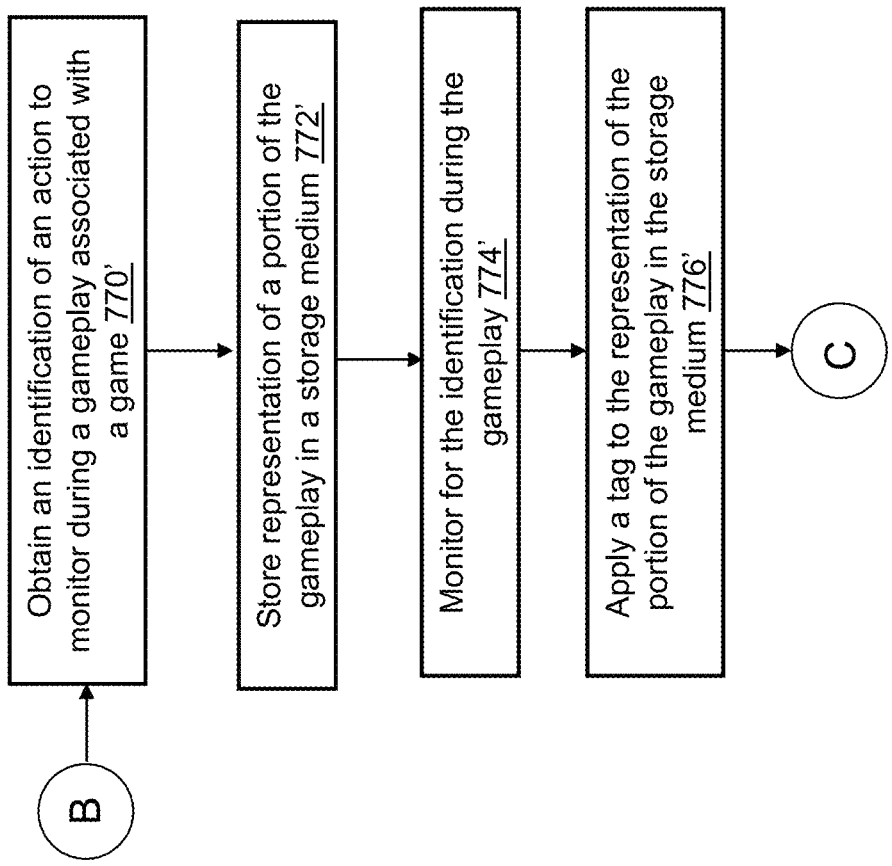
FIG. 7C depicts an illustrative embodiment of a fifth method utilized in the subject disclosure.

FIG. 7C illustrates another embodiment of a method that may be executed in conjunction with the flow shown in FIG. 7A. As shown in FIG. 7C, in step 770' the AMS application can obtain an identification of an action to monitor during a gameplay associated with a game. The identification of the action may include a specification of a number of actions per unit time.

In step 772', the AMS application can store a representation of a portion of the gameplay in a storage medium.

In step 774', the AMS application can monitor the gameplay for the identification of the action.

In step 776', the AMS application can apply a tag to the representation of the portion of the gameplay in the storage medium responsive to the monitoring.

The representation of the portion of the gameplay may include a first video clip that occurs prior to an occurrence of the action and a second video clip that occurs subsequent to the action. A first time duration of the first video clip, a first resolution of the first video clip, a second time duration of the second video clip, and a second resolution of the second video clip may be based on one or more user preferences.

The representation of the portion of the gameplay may include a video clip. The tag may include a watermark that is applied to the video clip. The watermark may include the identification of the action. The tag may include metadata that is associated with the video clip. The metadata may be searchable via a search engine. The metadata may include a selectable link that, when selected, causes a client device to obtain the video clip.

Figure 7D:
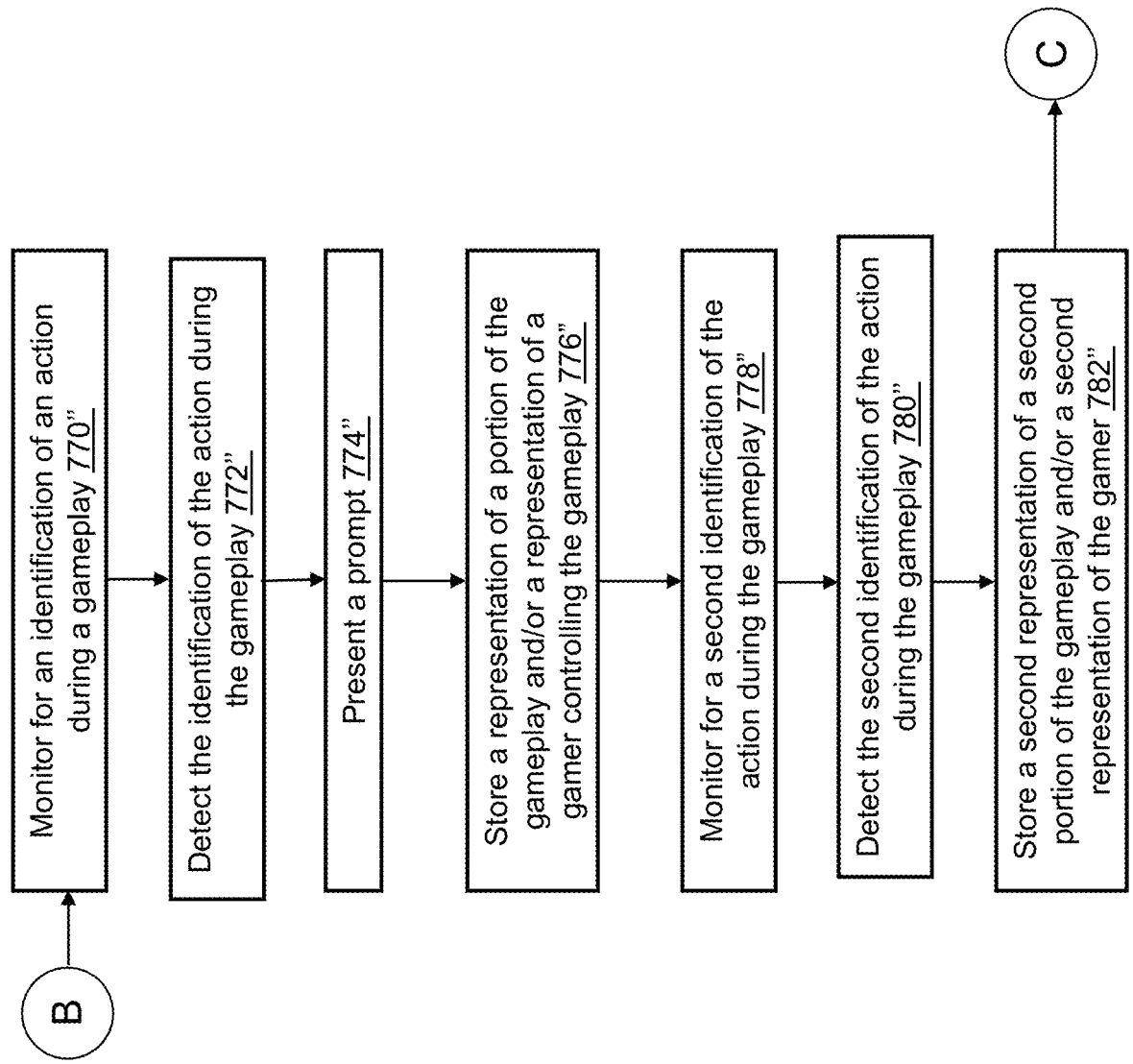
FIG. 7D depicts an illustrative embodiment of a sixth method utilized in the subject disclosure.

FIG. 7D illustrates another embodiment of a method that may be executed in conjunction with the flow shown in FIG. 7A. As shown in FIG. 7D, in step 770" the AMS application can monitor for an identification of an action during a gameplay.

In step 772", the AMS application can detect the identification of the action during the gameplay responsive to the monitoring.

In step 774", the AMS application can present a prompt responsive to the detecting.

In step 776", the AMS application can store a representation of a portion of the gameplay, a representation of a gamer controlling the gameplay, or a combination thereof, in a storage medium according to a user-generated input associated with the prompt.

In some embodiments, machine-learning/artificial intelligence may be applied to identify portions of a gameplay that are memorable or are of interest to a user (e.g., a gamer). For example, responsive to the user-generated input associated with the prompt in step 776", the AMS application can monitor for a second identification of the action in step 778".

In step 780", the AMS application can detect the second identification of the action during the gameplay responsive to the monitoring for the second identification.

In step 782", the AMS application can store a second representation of a second portion of the gameplay, a second representation of the gamer, or a combination thereof, in the storage medium without presenting a second prompt.

Once the AMS application at step 748 supplies to the OS of the computing device 206 a gaming action (i.e., one or more stimulations) from the method of FIG. 7B, the method of FIG. 7C, the method of FIG. 7D, or a combination thereof, the AMS application can proceed to step 734. The gaming action supplied to the OS at step 748 can be the unadulterated "original" gaming action of step 770, or an alternative gaming action generated by steps 794 or 796. At step 734, the OS determines whether to invoke in step 736 a software application identified in the stimulation(s) (e.g., gamer says "turn on team chat", which invokes a chat application), whether to forward the received stimulation(s) to the gaming software application in step 738, or combinations thereof.

Contemporaneous to the embodiments described above, the AMS application can monitor in step 750 for game action results supplied by the gaming application via API messages previously described. For instance, suppose the stimulation sent to the gaming application in step 738 is a command to shoot a pistol. The gaming application can determine that the shot fired resulted in a miss of a target or a hit. The gaming application can respond with a message which is submitted by way of the API to the AMS application that indicates the shot fired resulted in a miss or a hit. If IDs such as GUIDs were sent with each stimulation, the gaming application can submit game action results with their corresponding GUID to enable the AMS application to correlate the gaming action results with stimulations having the same GUID.

For example, if the command to shoot included the ID "1234", then the game action result indicating a miss will include the ID "1234", enabling the AMS application in step 752 to correlate the game action result to the stimulation having the same ID. If on other hand, the order of game action results can be maintained consistent with the order of the stimulations, then the AMS application can correlate in step 754 stimulations with game action results by the order in which stimulation were submitted and the order in which game action results are received. In step 756, the AMS application can catalogue stimulations and game action results. In another embodiment, the AMS application can be adapted to catalogue the stimulations in step 760. In this embodiment, step 760 can be performed as an alternative to steps 750 through 756. In another embodiment, step 760 can be performed in combination with steps 750 through 756 in order to generate a catalogue of stimulations, and a catalogue for gaming action results correlated to the stimulations.

Figure 7E:
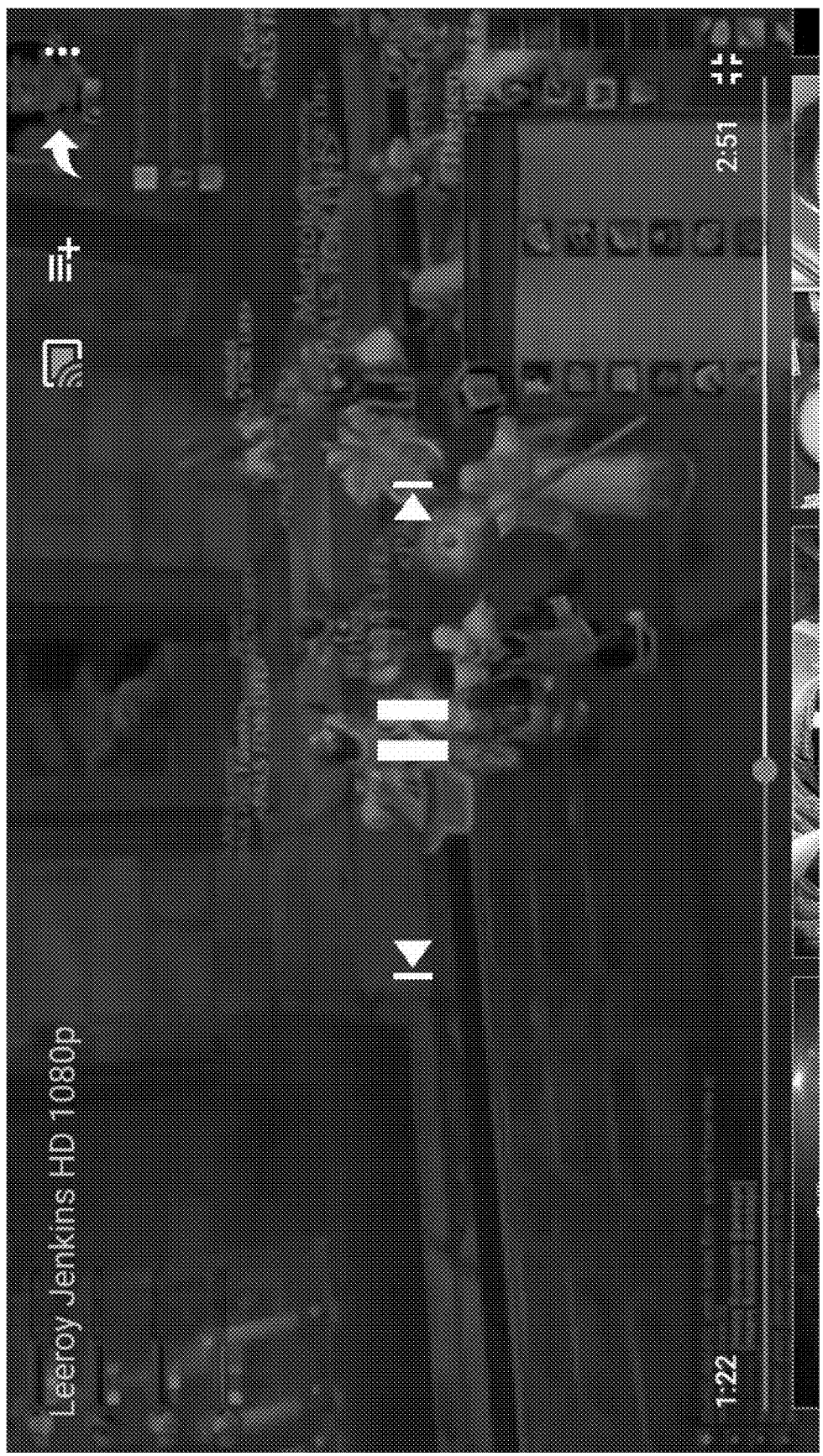
FIGS. 7E-7G depicts an illustrative embodiment of interfaces associated with a gameplay of a game.

FIG. 7E illustrates an interface that may be used to present at least a portion of a gameplay associated with a game. Various controls/commands may be presented as a part of the interface to facilitate a recording or capture of one or more portions of the gameplay.

Figure 7F:
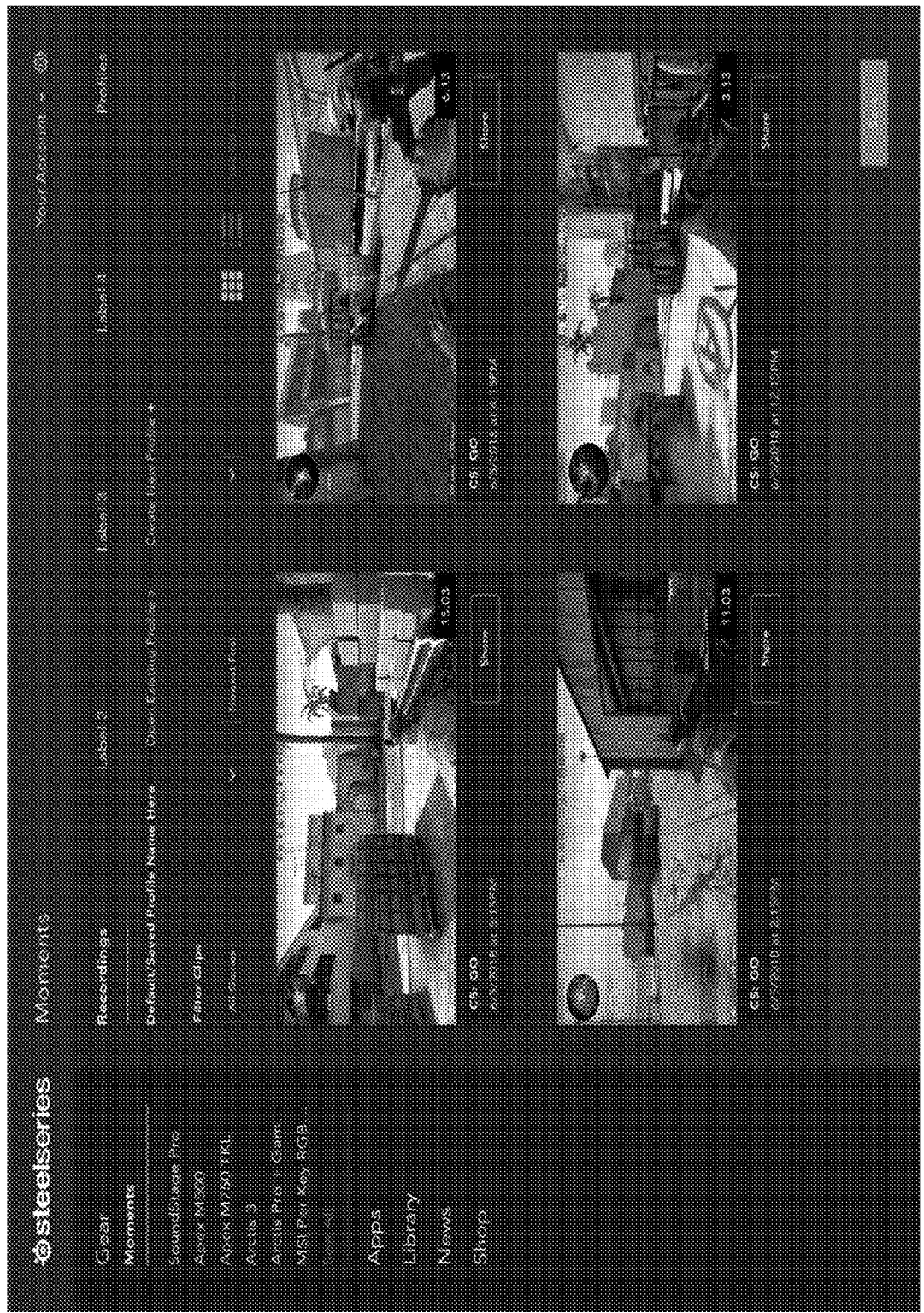

FIG. 7F illustrates an interface that may provide control over a recording or sharing of one or more representations (e.g., clips) of a gameplay associated with a game. Various controls, such as for example a "share" button or the like, may be provided to enable a user (e.g., a gamer) to post or otherwise share the representation(s). In some embodiments, editing controls may be provided to allow the user to customize the representation prior to, or subsequent to, sharing the representation.

Figure 7G:
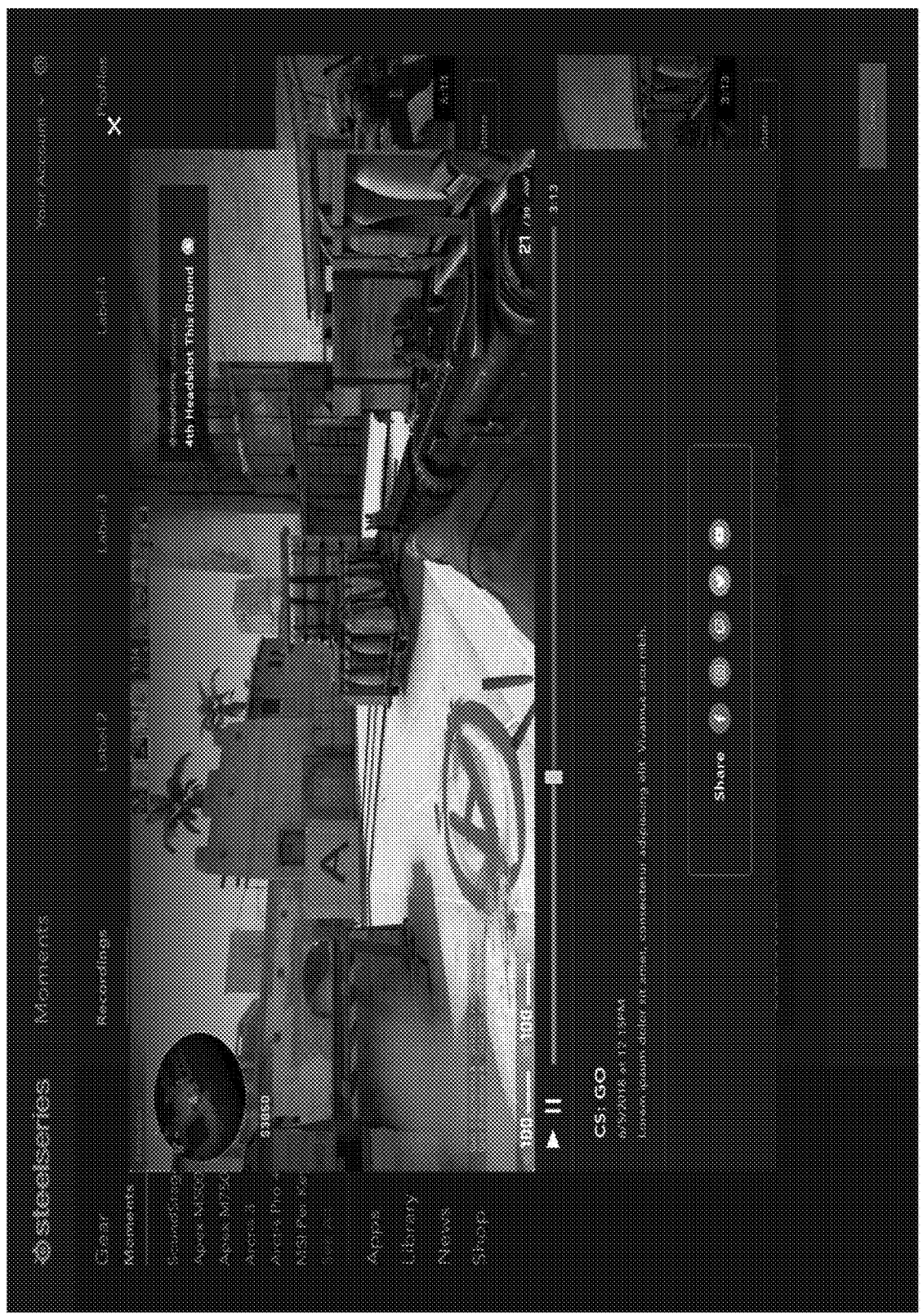

FIG. 7G illustrates an interface that may present a tag (e.g., a watermark and/or metadata) associated with a representation of a gameplay. The tag may include data acquired/obtained during the gameplay, such as for example a statement or other indication of results obtained by the gamer during the gameplay.

The methods described herein (e.g., the methods described above in conjunction with FIGS. 7A-7D) may incorporate additional aspects. For example, in some embodiments a clip may be generated based on a user defined keybind (on a keyboard, mouse, or controller). Keybinds to trigger the clipping of a buffer to save to a local file system may be customized (e.g., may be based on user preferences). The gamer will be able to choose: the actual key to bind to the action, and the time slice to save (N seconds before and N seconds after).

In some embodiments, clips may be auto-generated based on some event, such as for example a detected event, an audible input (e.g., screaming), or messages associated with a chat client, etc. In some embodiments, default settings may be provided, and those settings may be at least partially overridden/replaced based on affirmative user inputs and/or based on artificial intelligence/machine-learned user preferences.

In some embodiments, one or more filtering techniques may be applied to remove content from a representation of a gameplay that is not of interest. If multiple events/actions that are being monitored for happen within a threshold amount of time (which may coincide with a buffer time), an event/action endpoint may be extended to create one long time slice/representation of the gameplay. Alternatively, separate representations may be generated in some embodiments.

In some embodiments, tagging (e.g., watermarking) may be overlaid on a representation (e.g., a video) of a gameplay. A watermark may have a given level of transparency associated with it to avoid obscuring/blocking the representation of the gameplay. One or more logos may be applied as part of the tagging. In some embodiments, a watermark may pulsate or otherwise fade in-and-out. In this respect, dynamic watermarks may be used.

Aspects of sharing the representation of the gameplay may be controlled via one or more control parameters. Such control parameters may condition the sharing on a size of the representation (e.g., a video length), the content of the representation (e.g., controls may be present to limit a dissemination of the representation in view of intellectual property rights or other rights), etc. In some embodiments, a sharing of the representation of the gameplay may be limited to users that the gamer (or other entity) authorizes.

The foregoing embodiments for recording sliding window can represent a Moment Clip as referred to below. The subject disclosure that follows represents additional disclosures for recording Moment Clips and for configuring audio.

Figure 7H:
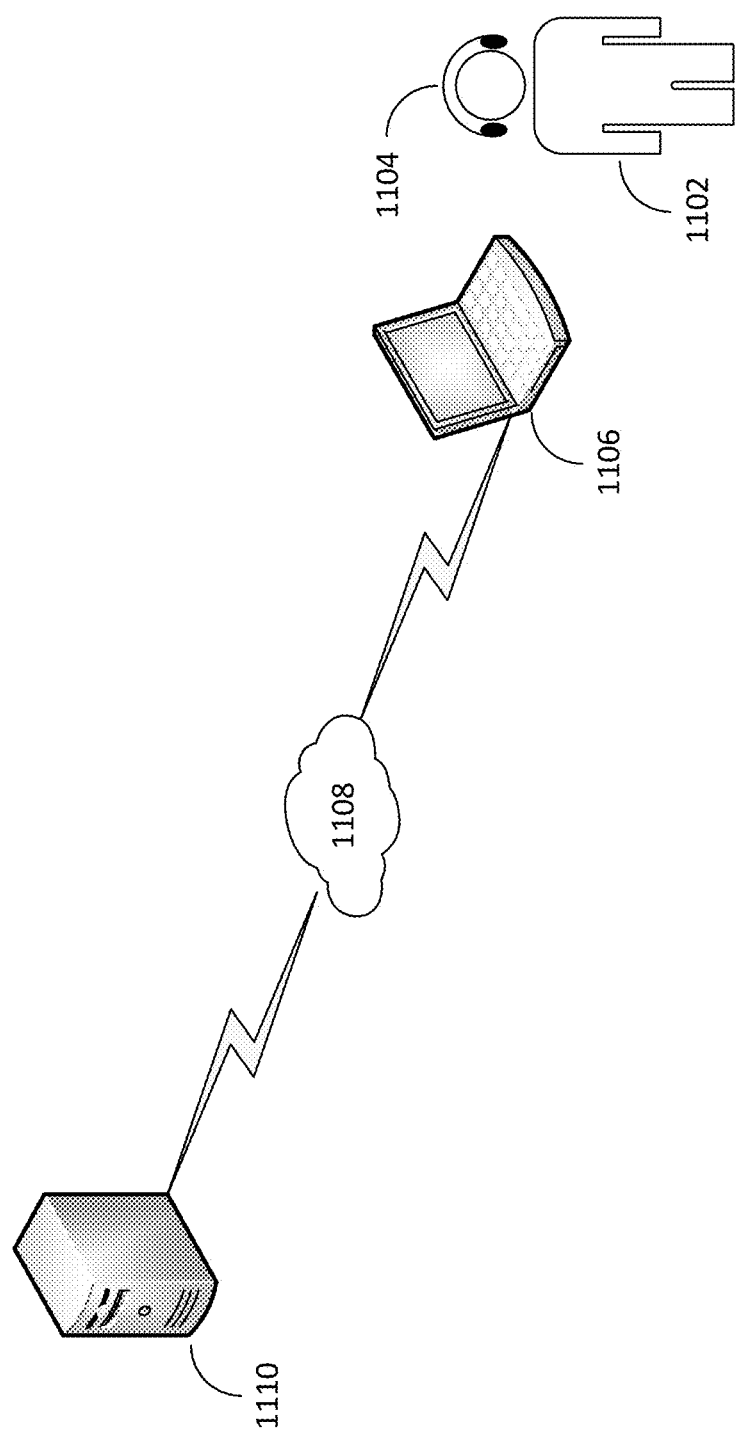
FIGS. 7H-7K depict illustrative embodiments of systems utilized in the subject disclosure.

FIGS. 7H-7K depict illustrative embodiments of systems utilized in the subject disclosure. Referring to FIG. 7H, in one or more embodiments, a player/user 1102 may play a video game on the user's computing device 1106 during a gaming session. A server 1110 (i.e. video game server) can provide the video game to a player's computing device 1106 (e.g. gaming system) over a communication network 1108. The computing device 1106 can include a mobile device, laptop computer, desktop computer, tablet computer, gaming console, virtual reality system or any other computing device. The communication network can be a wired communication network, a wireless communication network, or a combination thereof. The video game can be provided to other players over the communication network 1108 such that the player 1102 can interact with these players online through their respective avatars. In some embodiments, an audio output device for the video game can be integrated with the user's computing device 1106. In other embodiments, the audio output device 1104 can be a headset that is communicatively coupled to the user's computing device 1106 by a wired connection or a wireless connection. In further embodiments, the server 1110 can detect the video game executed on the user's computing device 1106 and detect different aspects of or actions taking place within the video game. This can include the server 1110 detecting a map for the video game executing on the user's computing device. A map can be a level, layout of a group of environments of the video game. Further, the server 1110 can obtain a map equalizer profile associated with the map for the video game.

An equalizer profile comprises audio settings for a group of audio frequencies that can be used by an audio output device 1104 of the user's computing device 1106 that can enhance or adjust the sound heard by the player during video game play. For example, if the map of the video game is a group of outdoor environments, the map equalizer profile may include settings to create an echo affect when sound is provided to the audio output device 1104. In additional embodiments, the server 1110 can provider, over the communication network 1108, instructions to the user's computing device 1106 according to the map equalizer profile. That is, the instructions indicate to the user's computing device to adjust the audio output of the video game according to map equalizer profile. Upon receiving the instructions, the user's computing device 1106 adjust the audio output of the video game according to the map equalizer profile.

Figure 7I:
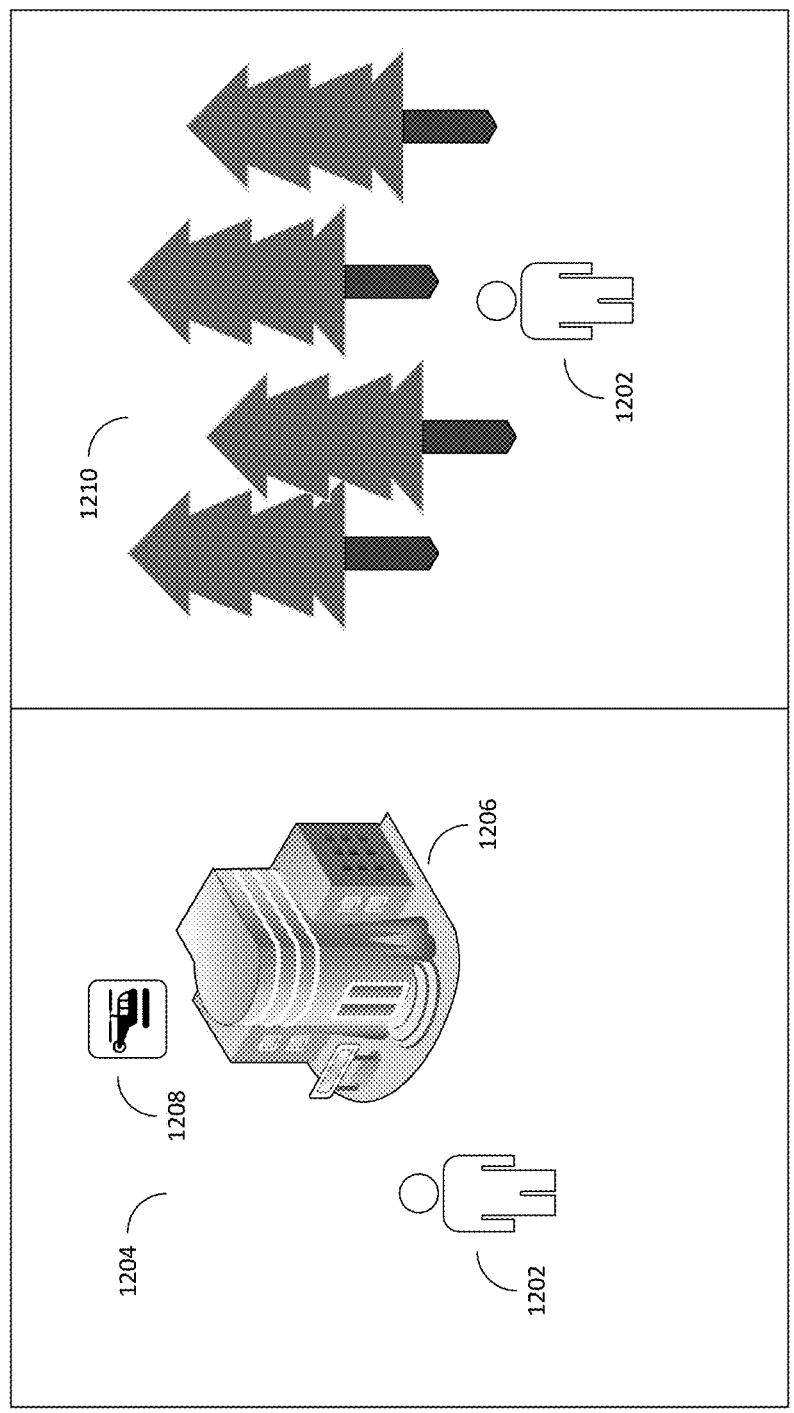

Referring to FIG. 7I, in one or more embodiments, a player may play a video game on the user's computing device. A display of the user's computing device can present an avatar 1202 for the player in a video game environment 1204 during a gaming session. The server 1110 can monitor the avatar 1202 and detect in which environment the avatar 1202 is located within the map of the video game. In some embodiments, the avatar 1202 can be detected to be located within an urban environment 1204 that includes a helicopter 1208 landing on a building 1206. In further embodiments, the server 1110 can obtain the urban environment equalizer profile associated with the urban environment in response to determining the avatar is located within the urban environment 1204. Further, the server 1110 can provide instructions to the user's computing device 1106 over the communication network 1108 according to the map equalizer profile and the urban environment equalizer profile. That is, the instructions indicate to the user's computing device to adjust the audio output of the video game according to both map equalizer and the urban environment equalizer profile. In some embodiments, the map equalizer profile and the urban environment equalizer profile can be adjust the audio output device in a layered fashion. That is, the audio output device is first configured according to the audio settings of the map equalizer profile and then configured according to the urban environment equalizer profile. Upon receiving the instructions, the user's computing device 1106 adjusts the audio output of the video game according to the map equalizer profile and the urban environment equalizer profile. For example, the map equalizer profile may include audio settings for an outdoor environment generally such as, for example, generating an echo effect typical in some outdoor environments. Further, for example, the urban environment equalizer profile may include audio settings that generate ambient noise due to the helicopter or other sound effects for the audio output. The audio output device associated with the user's computing device can provide audio output for the video game according to both audio settings of the map equalizer profile and the audio settings of the urban environment equalizer profile.

In one or more embodiments, the server 1110 can monitor the avatar 1202 and determine that the avatar 1202 for the player has moved to a different geographic location, which can be within a forested environment and obtain the forested environment equalizer profile associated with the forested environment. Further, the server 1110 can provide instructions to the user's computing device 1106 over the communication network 1108 according to the map equalizer profile and the forested environment equalizer profile. That is, the instructions indicate to the user's computing device to adjust the audio output of the video game according to map equalizer and the forested environment equalizer profile. Upon receiving the instructions, the user's computing device 1106 adjusts the audio output of the video game according to the map equalizer profile and the forested environment equalizer profile. For example, the forested environment equalizer profile may include audio settings that generate ambient noise due to the wind blowing, leaves rustling or other sound effects for the audio output.

Figure 7J:
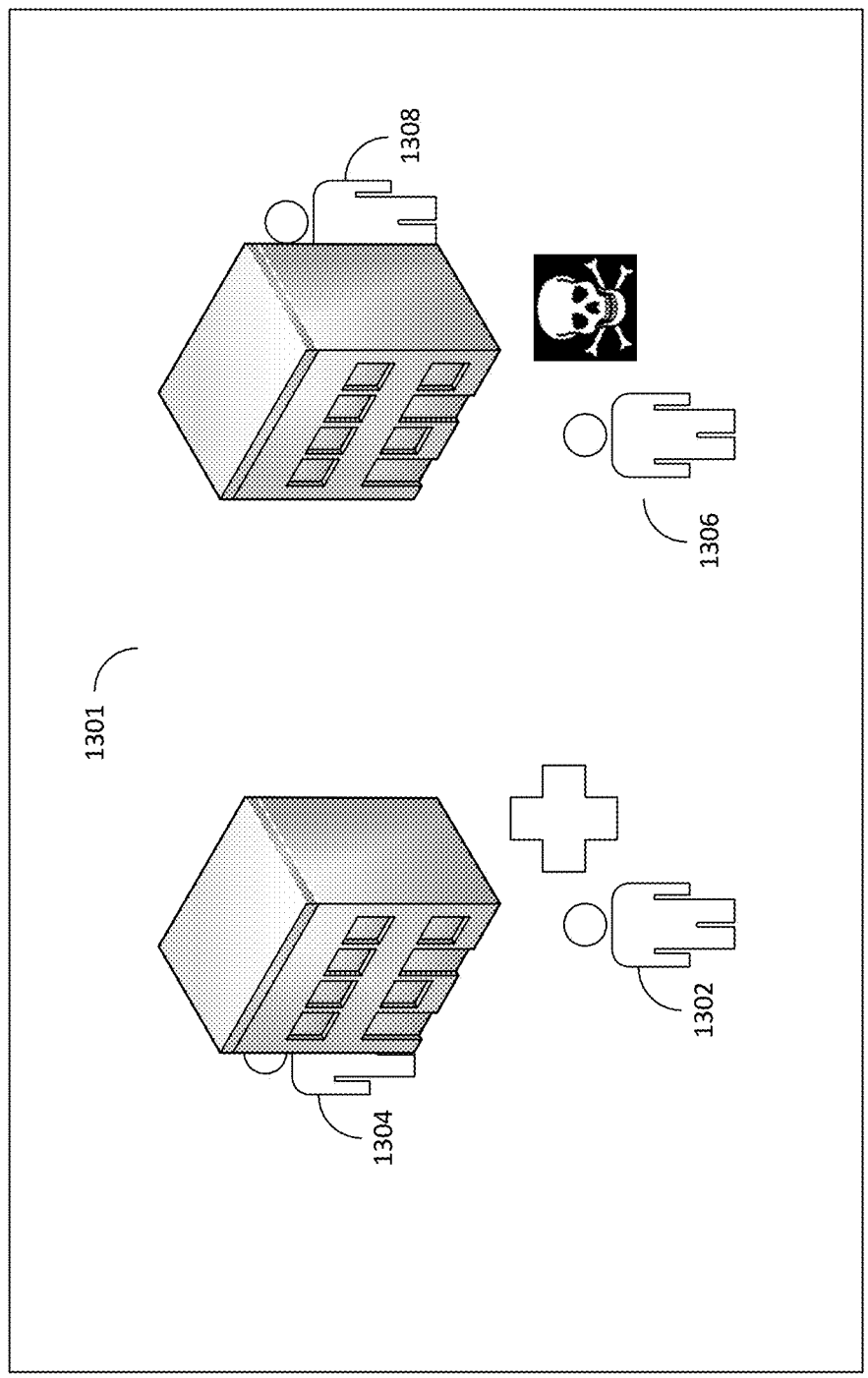

Referring to FIG. 7J, in one or more embodiments, a server 1120 can detect a first avatar 1302 for a first player may be in a urban environment 1301 of a video game interacting with a second avatar 1304 for a second player, a third avatar 1306 for a third player, and a fourth avatar 1308 for a fourth player. Further, the server 1110 can detect the second avatar 1304 interacting with the first avatar 1302 injuring it and decreasing its health. If so, the injury can be an event within the video game. The server 1110 can detect or otherwise determine this event (injury) associated with the first avatar and obtain an event equalizer profile associated with the event. For example, if the first avatar 1302 is injured (event), the associated event equalizer profile can include audio settings that cause the voice of the first avatar 1302 to be high-pitched (e.g. high frequencies are amplified) to indicate the first avatar 1302 is injured.

In one or more embodiments, the server 1110 can detect the fourth avatar 1308 interacting with the third avatar 1306, killing it. The third avatar 1306 can be resurrected, but the third avatar may have sustained several losses of life that exceeds a time period threshold (e.g. three losses of life within three minutes). If so, this can be an event within the video game. The server 1110 can detect or otherwise determine this event associated with the third avatar and obtain an event equalizer profile associated with this event. For example, the associated event equalizer profile can include audio settings that cause the voice of the third avatar 1306 to be low-pitched (e.g. low frequencies are amplified) to indicate the third avatar 1306 has incurred an event, namely sustaining several losses of life over a time period threshold.

Figure 7K:
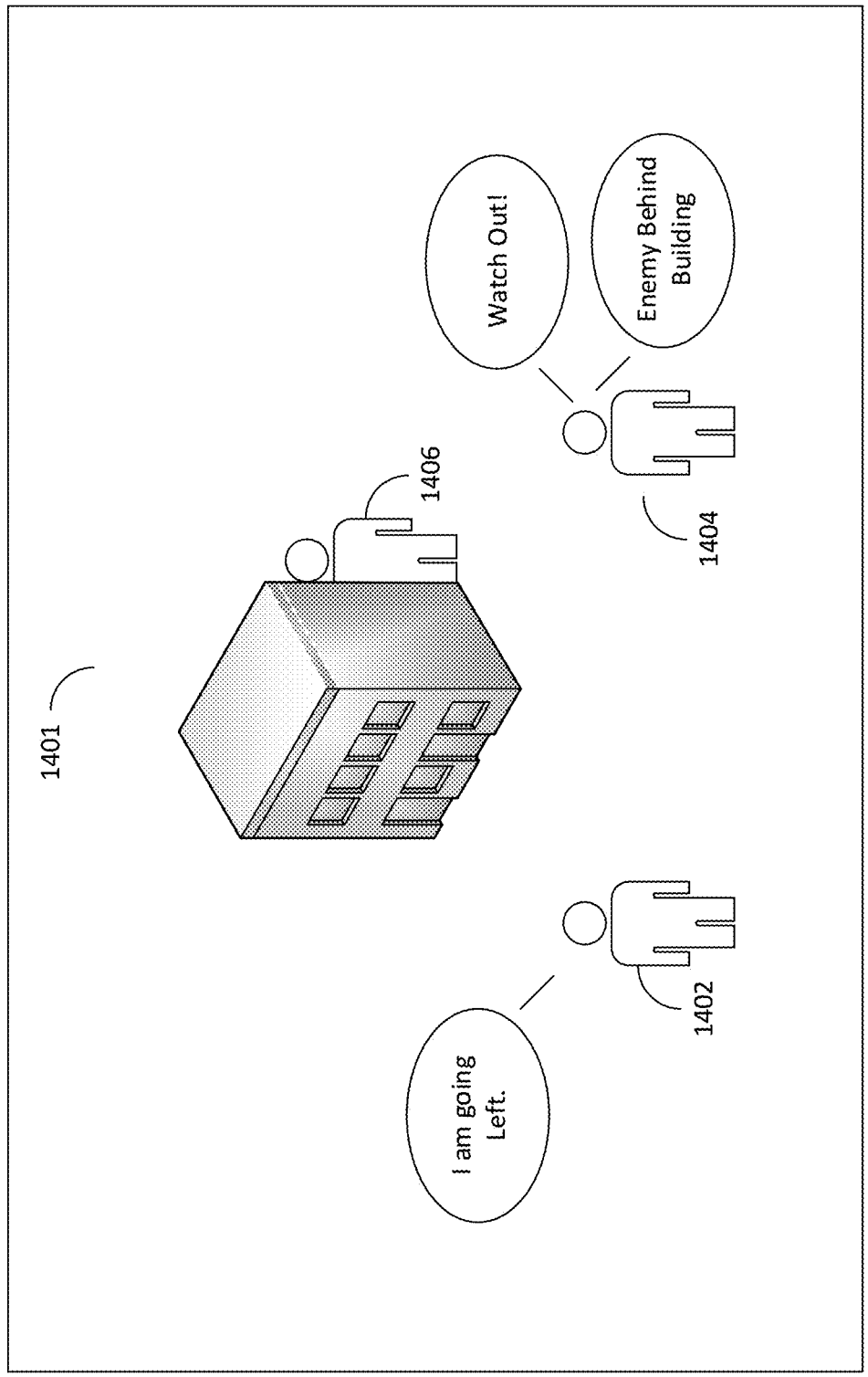

Referring to FIG. 7K, in one or more embodiments, the server 1110 can detect a first avatar 1402 associated with a first player of a video game, a second avatar 1404 associated with a second player of the video game, and a third avatar 1406 associated with a third player of the video game interacting in an urban video game environment 1401. The first avatar 1402 may tell the second avatar 1404 that it is travelling left of the building. However, the second avatar 1404 detects the third avatar 1406 behind the building. Further, the second avatar may tell the first avatar to "Watch Out!" The server 1110 can be programmed according to the executed video game to detect such a warning (e.g. commands such as "Watch Out," "Look Out," I've Been Shot," etc.) through voice recognition techniques and determine an equalizer profile for the second player when such a warning is detected by the server 1110. Any subsequent speech said by the second player to be adjusted according to the audio settings of the equalizer profile. For example, the subsequent speech can be "Enemy Behind Building!" Such speech can be amplified, sped up, slowed down, or otherwise adjusted to signal to the first player that there is imminent danger by the audio settings of the equalizer profile. The detecting of a warning can be a video game rule and the equalizer profile associated with the detected warning can be a rule equalizer profile.

Referring to FIG. 7H, the server 1110 can detect an anomaly of the headset 1104 for a player of the video game. In some embodiments, the anomaly can be detected by determining the type of headset (i.e. manufacturer). Further, the server 1110 can obtain a headset equalizer profile from a manufacturer information repository (e.g. database, web server, etc.) to overcome or otherwise offset the anomaly. In other embodiments, the server 1110 can receive, over the communication network 1108, a group of test sounds generated by each earpiece of the headset and determine the anomaly according to the group of test sounds. Further, the server 1110 can generate the headset equalizer profile to include audio settings overcome the headset anomaly. In further embodiments, the anomaly can be a frequency range that is dampened by the headset and the headset equalizer profile provides instruction to amplify the frequency range. In additional embodiments, the anomaly can be a frequency range that is amplified by the headset and the headset equalizer profile provides instructions to dampen the frequency range.

Figure 7L:
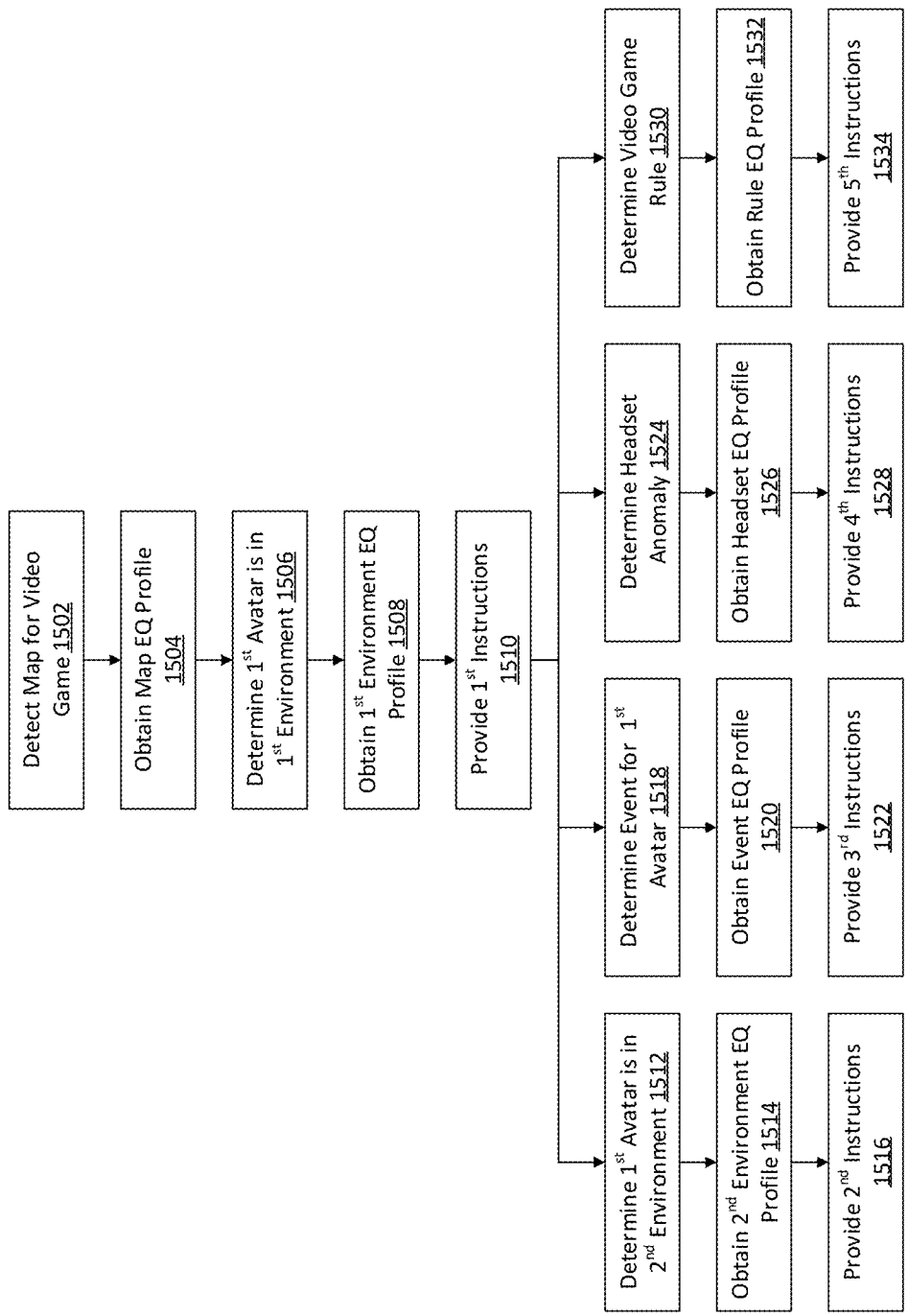
FIG. 7L depicts an illustrative embodiment of a method utilized in the subject disclosure.

FIG. 7L depicts an illustrative embodiment of a method 1500 utilized in the subject disclosure. In one or more embodiments, the method 1500 can be implemented by a video game server that executes the AMS application. The method 1500 can include the video game server, at 1502, detecting, over a communication network, a map associated with a gaming session for a video game executing on a computing device (e.g. gaming system) associated with a first user. Further, the method 1500 can include the video game server, at 1504, obtaining a map equalizer profile associated with the map for the video game. In some embodiments, the map equalizer profile (or any equalizer profile) can be obtained from a database or other information repository over a communication network. In other embodiments the map equalizer profile (or any equalizer profile) can be stored on the video game server itself. In addition, the method 1500 can include the video game server, at 1506, determining, over a communication network, a first avatar, associated with the first user, is located within a first environment of the map for the video game. Also, the method 1500 can include the video game server, at 1508, obtaining a first environment equalizer profile associated with the first environment, and, at 1510, providing, over a communication network, first instructions to the computing device associated with the first user according to the map equalizer profile and the first environment equalizer profile. The first instructions can indicate to the computing device to adjust audio output of the video game according to the map equalizer profile and the first environment equalizer profile.

In one or more embodiments, the method 1500 can include the video game server, at 1512, determining, over a communication network, the first avatar, associated with the first user, is located within a second environment of the map for the video game. Further, the method 1500 can include the video game server, at 1514, obtaining a second environment equalizer profile associated with the second environment. In addition, the method 1500 can include the video game server, at 1516, providing, over a communication network, second instructions to the computing device associated with the first user, according to the map equalizer profile and the second environment equalizer profile. The second instructions indicate to the computing device to adjust the audio output of the video game according to the map equalizer profile and the second environment equalizer profile.

In one or more embodiments, the method 1500 can include the video game server, at 1518, determining, over a communication network, an event associated with first avatar. Further, the method 1500 can include the video game server, at 1520, obtaining an event equalizer profile associated with the event. In addition, the method 1500 can include the video game server, at 1522, providing, over a communication network, third instructions to the computing device associated with the first user, according to the map equalizer profile, first environment equalizer profile, and the event equalizer profile. The third instructions indicate to the computing device to adjust the audio output of the video game according to the map equalizer profile, the first environment equalizer profile, and the event equalizer profile. The event can include, but is not limited to, one of loss of health, number of deaths within a time period, action of the first avatar, action of a second avatar associated with a second user, or a combination thereof.

In one or more embodiments, the audio output can be provided by a headset associated with the computing device of the first user. The method 1500 can include the video game server, at 1524, determining, over a communication network, an anomaly of the headset. Further, the method 1500 can include the video game server, at 1526, obtaining a headset equalizer profile based on the anomaly of the headset. In addition, the method 1500 can include the video game server, at 1528, providing, over a communication network, fourth instructions to the computing device associated with the first user, according to the map equalizer profile, first environment equalizer profile, and the headset equalizer profile. The fourth instructions indicate to the computing device to adjust the audio output of the video game according to the map equalizer profile, the first environment equalizer profile, and the headset equalizer profile. In some embodiments, the determining of the anomaly of the headset comprises determining a type of the headset. In other embodiments, the obtaining of the headset equalizer profile comprises obtaining, over a communication network, the headset equalizer profile from an information repository (e.g. database, web server, etc.) associated with a manufacturer of the headset. In further embodiments, the determining of the anomaly of the headset comprises receiving, over a communication network, a group of tests sounds generated by each earpiece of the headset, and determining the anomaly of the headset based on the group of test sounds. In additional embodiments, the obtaining of the headset equalizer profile comprises generating, by the video game server, the headset equalizer profile according to the group of test sounds. In some embodiments, the anomaly includes amplifying a frequency range by the headset and the computing device adjusts the headset according to the headset equalizer profile to dampen the frequency range. In other embodiments, the anomaly includes dampening a frequency range by the headset and the computing device adjusts the headset according to the headset equalizer profile to amplify the frequency range.

In one or more embodiments, the method 1500 can include the video game server, at 1530, determining, over a communication network, a video game rule is implemented within the video game. Further, the method 1500 can include the video game server, at 1532 determining a rule equalizer profile associated with the video game rule. In addition, the method 1500 can include the video game server, at 1534 providing, over a communication network, fifth instructions to the computing device associated with the first user according to the map equalizer profile, the first environment equalizer profile, and the rule equalizer profile. The fifth instructions indicate to the computing device to adjust audio output of the video game according to the map equalizer profile, the first environment equalizer profile, and the rule equalizer profile.

Note the order of the steps in the methods described herein can be performed in any order. It will be appreciated that the parts of embodiments described herein can be combined in whole or in part with other embodiments.

In one or more embodiments, a video game server or other computing device can configure an audio presentation of a gaming session of a video game according to a first equalizer audio profile. The first equalizer audio profile includes first audio settings for a first plurality of audio frequencies. Further, the video game server can monitor movement of an avatar of the video game during the gaming session, identifying a geographic location of the avatar in a map of the video game based on the movement of the avatar, and obtaining a second equalizer audio profile according to the geographic location of the avatar. The second equalizer audio profile includes second audio settings for a second plurality of audio frequencies that differ from the first audio settings for the first plurality of audio frequencies. In addition, the video game server can adjust the audio presentation based on the second equalizer audio profile. In some embodiments, the first equalizer audio profile and the second equalizer audio profile are obtained from a supplier of the video game. In other embodiments, the first equalizer audio profile and the second equalizer audio profile are supplied by customization settings provided by a gamer of the video game. In further embodiments, the first equalizer audio profile and the second equalizer audio profile are configured to adjust an audio frequency anomaly of an audio headset utilized by a gamer to listen to the audio presentation of the video game. In additional embodiments, the video game server can adjust a voice of a gamer controlling the avatar by obtaining a third equalizer audio profile to adjust the voice of the gamer. Further, the adjusting the voice of the gamer is responsive to a triggering event detected during the gaming session.

Figure 8:
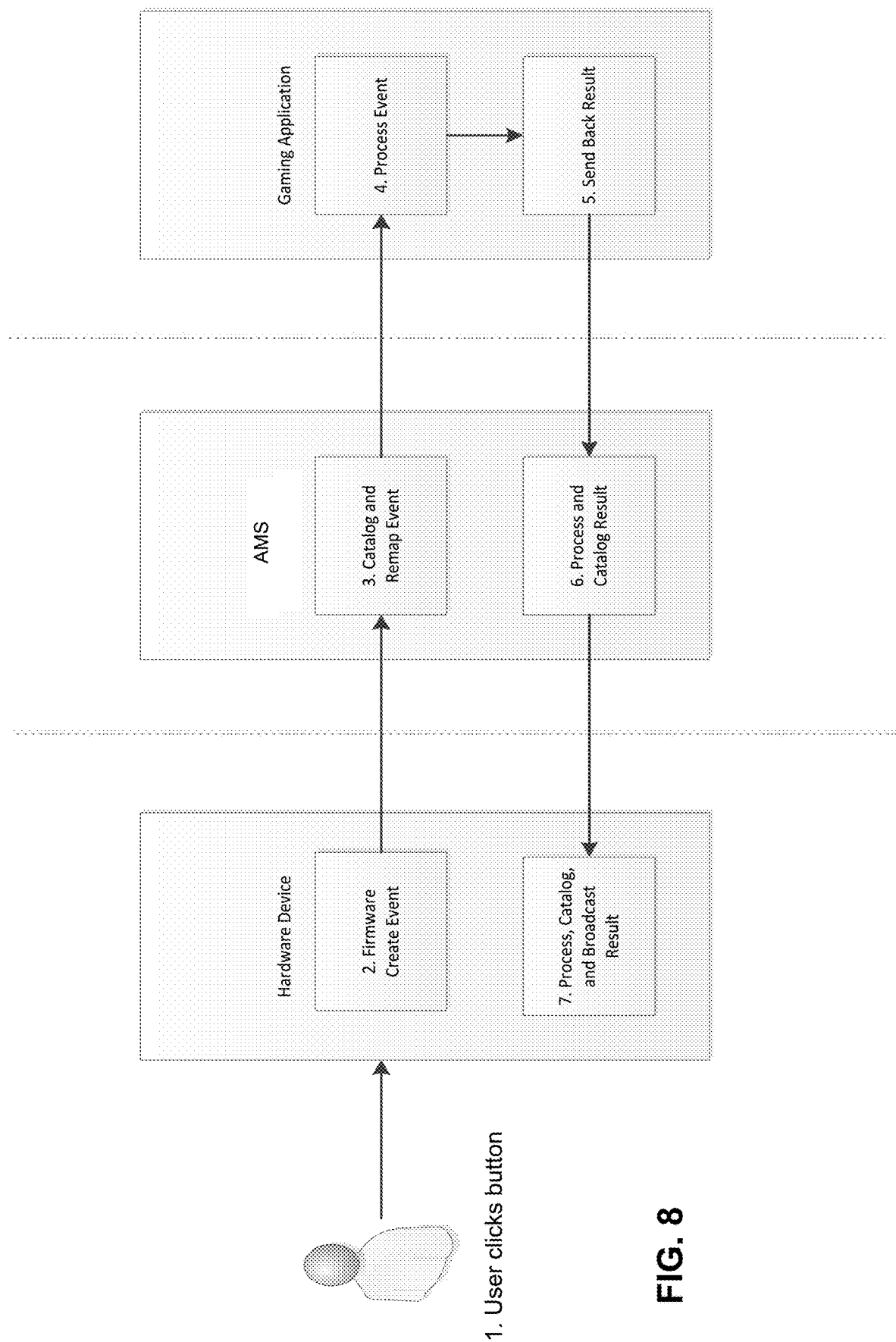
FIG. 8 depicts an illustrative embodiment of a system operating at least in part according to the methods of FIGS. 5-7D.
Figure 9:
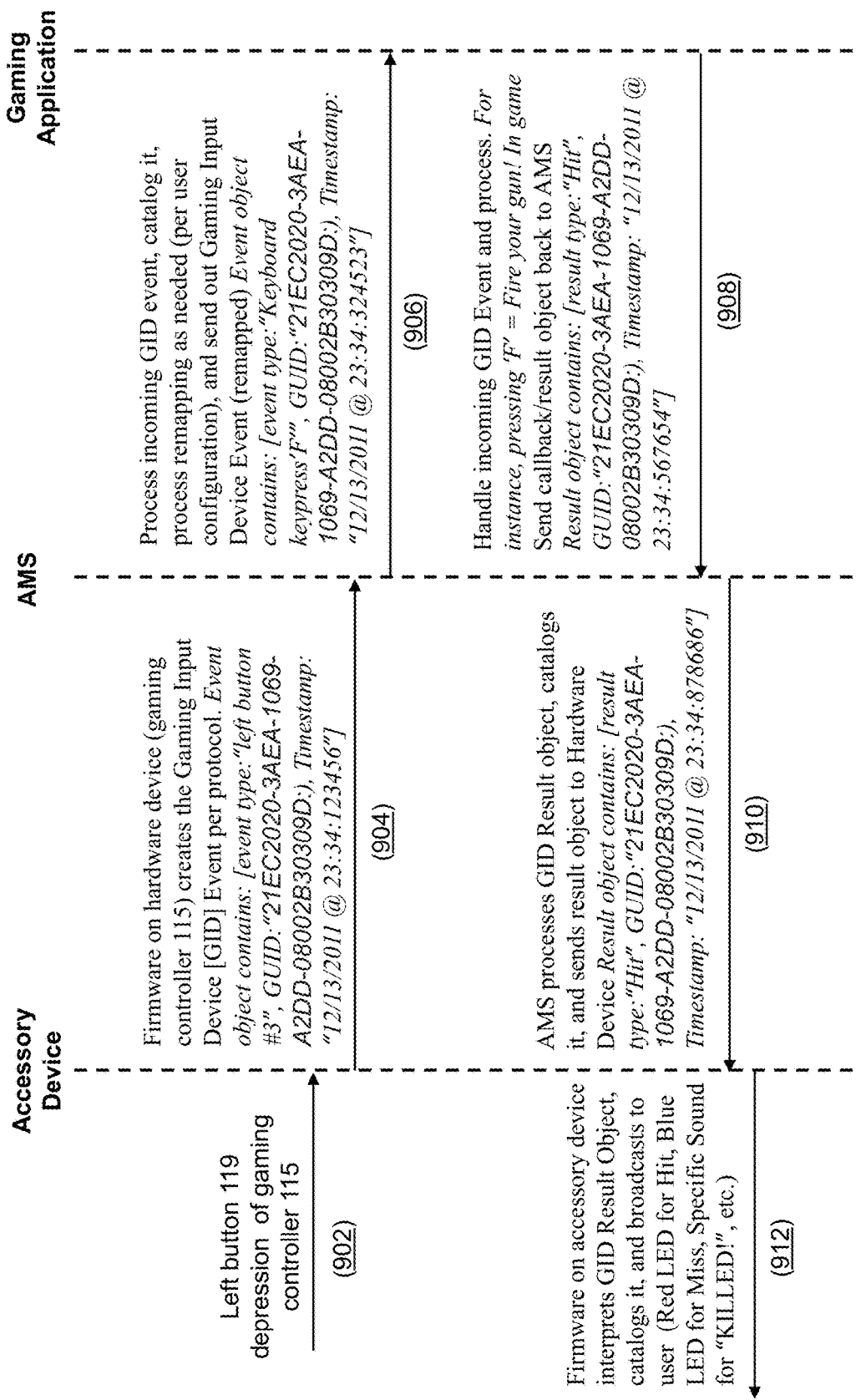
FIG. 9 depicts an illustrative embodiment of a communication flow diagram utilized by the system of FIG. 12.

FIGS. 8-9 illustrate embodiments of a system with a corresponding communication flow diagram for correlating stimulations and gaming action results. In this illustration a user clicks the left button 119 of the gaming controller 115. The gaming controller 115 can include firmware (or circuitry), which creates an event as depicted by event 2 in FIG. 8. The button depression and the event creation are depicted in FIG. 9 as steps 902 and 904. In step 904, the firmware of the gaming controller 115 can, for example, generate an event type "left button #3", and a unique GUID with a time stamp which is submitted to the AMS application. Referring back to FIG. 8, the AMS application catalogues event 3, and if a substitute stimulation has been predefined, remaps the event according to the substitution. The remapped event is then transmitted to the gaming application at event 4. Event 3 of FIG. 8 is depicted as step 906 in FIG. 9. In this illustration, the AMS application substitutes the left button #3 depression stimulus with a "keyboard 'F'" depression which can be interpreted by the gaming application as a fire command. The AMS application in this illustration continues to use the same GUID, but substitutes the time stamp for another time stamp to identify when the substitution took place.

Referring back to event 4, the gaming application processes the event and sends back at event 5 a game action result to the AMS application which is processed by the AMS application at event 6. The AMS application then submits the results to the accessory at event 7. Events 4 and 5 are depicted as step 908 in FIG. 9. In this step, the gaming application processes "F" as an action to fire the gamer's gun, and then determines from the action the result from logistical gaming results generated by the gaming application. In the present illustration, the action of firing resulted in a hit. The gaming application submits to the AMS application the result type "Hit" with a new time stamp, while utilizing the same GUID for tracking purposes. At step 910, the AMS application correlates the stimulation "left button #3 (and/or the substitute stimulation keyboard "F") to the game result "Hit" and catalogues them in memory. The AMS application then submits to the accessory (e.g., gaming controller 115) in step 910 the game action results "Hit" with the same GUID, and a new time stamp indicating when the result was received. Upon receiving the message from the AMS application, the accessory in step 912 processes the "Hit" by asserting a red LED on the accessory (e.g., left button 119 illuminates in red or other LED of the gaming controller 115 illuminates in red) to indicate a hit. Other notification notices can be used such as another color for the LED to indicate misses, a specific sound for a hit, or kill, a vibration or other suitable technique for notifying the gamer of the game action result.

Upon reviewing the aforementioned embodiments, it would be evident to an artisan with ordinary skill in the art that the embodiments of the subject disclosure can be modified, reduced, or enhanced without departing from the scope of the claims described below. For example, the AMS application can be executed from an accessory 115 or computing device 206 to perform the embodiments described in the subject disclosure. The AMS application can also be operated from a remote server ("cloud services"). In yet another embodiment, functions of the AMS application can be distributed between devices. In yet another embodiment, the AMS application can be configured to track the performance of a gamer and adapt a threshold as the gamer improves or declines in performance.

For instance, as a gamer's performance improves with a particular gaming action, the threshold associated with the gaming action can be adapted to be less sensitive in detecting an over usage state. Similarly, the sensitivity of the threshold can be increased to promptly identify an over usage state of a gaming action if the gamer's performance declines as a result of an over usage of the gaming action. Additionally, the AMS application can be adapted to add gaming actions to an exclusion table when the gamer's performance substantially improves as a result of using the gaming action being excluded. The exclusion table can also be changed by the AMS application by removing a gaming action from the exclusion table responsive to its excessive use causing a decline in a gamer's performance.

Other embodiments can be applied to the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
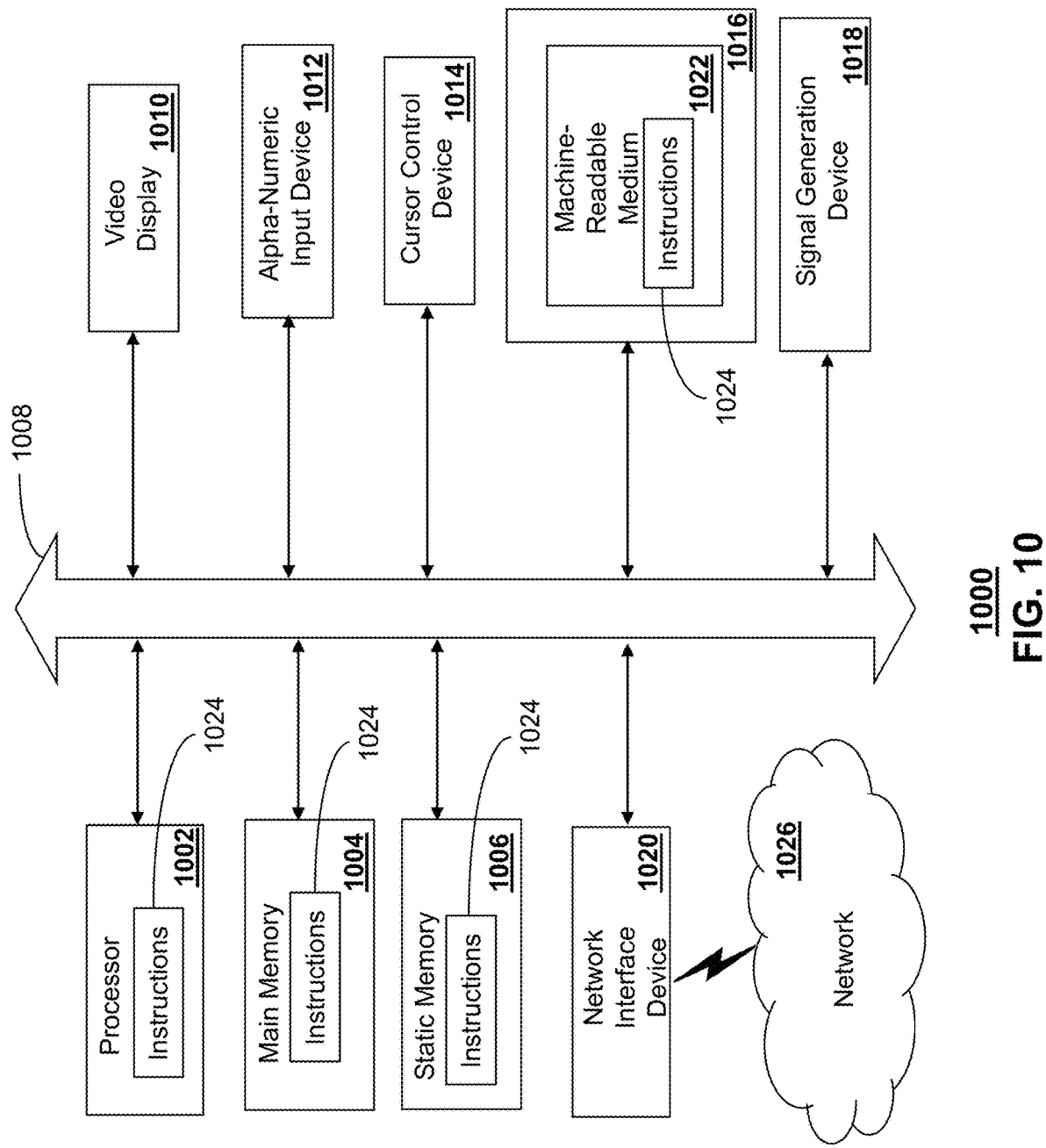
FIG. 10 depicts an illustrative diagrammatic representation of a machine in the form of a computer system within which a set of instructions, when executed, may cause the machine to perform any one or more of the methodologies disclosed herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as an accessory, computing device or combinations thereof. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the device, facilitate performance of operations, the operations comprising:
   detecting a gaming session for a video game executing on a computing device associated with a first user;
   determining a first geographic location of a first avatar associated with the first user within the video game;
   obtaining a first equalizer profile associated with the video game and a second equalizer profile associated with the video game according to the first geographic location of the first avatar; and
   providing first instructions to the computing device associated with the first user according to the first equalizer profile and the second equalizer profile, wherein the first instructions indicate to adjust audio output of the video game according to the first equalizer profile and the second equalizer profile, wherein adjusting of the audio output comprises generating first audio output over a first frequency range according to the first equalizer profile and generating second audio output over a second frequency range according to the second equalizer profile, wherein the audio output comprises the first audio output and the second audio output.

2. The device of claim 1, wherein the first audio output comprises first ambient noise associated with the video game.

3. The device of claim 1, wherein the first equalizer profile comprises a map equalizer profile, wherein the second equalizer profile comprises a first environment profile equalizer.

4. The device of claim 1, wherein the operations comprise:
determining a second geographic location of the first avatar associated with the first user of the video game;
obtaining a third equalizer profile associated with the second geographic location; and
providing second instructions to the computing device associated with the first user according to the first equalizer profile and the third equalizer profile, wherein the second instructions indicate to the computing device to adjust the audio output of the video game according to the first equalizer profile and the third equalizer profile.

5. The device of claim 4, wherein the third equalizer profile comprise a second environment equalizer profile.

6. The device of claim 4, wherein the adjusting of the audio output of the video game according to the first equalizer profile and the third equalizer profile comprises generating third audio output over a third frequency range.

7. The device of claim 6, wherein the third audio output comprises second ambient noise associated with the video game.

8. The device of claim 1, wherein the operations comprise:
determining an event associated with the first avatar;
obtaining an event equalizer profile associated with the event; and
providing third instructions to the computing device associated with the first user according to the first equalizer profile, the second equalizer profile, and the event equalizer profile, wherein the third instructions indicate to the computing device to adjust the audio output of the video game according to the first equalizer profile, the second equalizer profile, and the event equalizer profile.

9. The device of claim 8, wherein the event includes one of loss of health, number of deaths within a time period, action of the first avatar, action of a second avatar associated with a second user, or combination thereof.

10. The device of claim 1, wherein the audio output is provided by a headset, wherein the operations further comprise:
determining anomaly of the headset;
obtaining a headset equalizer profile based on the anomaly of the headset; and
providing fourth instructions to the computing device associated with the first user according to the first equalizer profile, the second equalizer profile, and the headset equalizer profile, wherein the fourth instructions indicate to the computing device to adjust the audio output of the video game according to the first equalizer profile, the second equalizer profile, and the headset equalizer profile.

11. The device of claim 10, wherein the determining of the anomaly of the headset comprise determining a type of headset.

12. The device of claim 11, wherein the obtaining of the headset equalizer profile comprises obtaining the headset equalizer profile from an information repository associated with a manufacturer of the headset.

13. The device of claim 10, wherein the anomaly includes amplifying a fourth frequency range by the headset and the computing device adjusts the headset according to the headset equalizer profile to dampen the fourth frequency range.

14. The device of claim 10, wherein the anomaly include dampening a fifth frequency range by the headset and the computing device adjusts the headset according to the headset equalizer profile to amplify the fifth frequency range.

15. The device of claim 1, wherein the operations further comprise:
determining a video game rule is implemented within the video game;
determining a rule equalizer profile associated with the video game rule; and
providing fifth instructions to the computing device associated with the first user according to the first equalizer profile, the second equalizer profile, and the rule equalizer profile, wherein the fifth instructions indicate to the computing device to adjust the audio output of the video game according to the first equalizer profile, the second equalizer profile, and the rule equalizer profile.

16. A non-transitory, machine-readable storage medium, comprising instructions, wherein responsive to executing the instructions, a processor performs operations comprising:
detecting a gaming session for a video game executing on a computing device associated with a first user;

determining a first geographic location of a first avatar associated with first user within the video game;

obtaining a first equalizer profile associated with the video game according to the first geographic location of the first avatar;

determining an event associated with the first avatar of the first user;

obtaining an event equalizer profile associated with the event; and providing first instructions to the computing device associated with the first user according to the first equalizer profile and the event equalizer profile, wherein the first instructions indicate to the computing device to adjust audio output of the video game according to the first equalizer profile and the event equalizer profile, wherein adjusting of the audio output of the video game comprises adjusting voice output associated with the first avatar over a first frequency range according to the event equalizer profile and generating first audio output over a second frequency range according to the first equalizer profile.

17. The non-transitory, machine-readable storage medium of claim 16, wherein the event includes one of loss of health, number of deaths within a time period, action of the first avatar, action of a second avatar associated with a second user, or combination thereof.

18. A method, comprising:

detecting, by processing system including a processor, a gaming session for a video game executing on a computing device associated with a user;

determining, by the processing system, a first geographic location of an avatar associated with the user within the video game;

obtaining, by the processing system, a first equalizer profile associated with the video game according to the first geographic location of the avatar;

determining, by the processing system, an anomaly of a headset;

determining, by the processing system, a headset equalizer profile based on the anomaly of the headset; and providing, by the processing system, first instructions to the computing device associated with the user according to the first equalizer profile and the headset equalizer profile, wherein the first instructions indicate to the computing device to adjust audio output of the video game according to the first equalizer profile and the headset equalizer profile, wherein adjusting of the audio output comprises adjusting a voice output associated with the avatar over a first frequency range according to the headset equalizer profile and generating first audio output over a second frequency range according to the first equalizer profile.

19. The method of claim 18, wherein the determining of the anomaly of the headset comprises determining, by the processing system, a type of headset.

20. The method of claim 19, wherein the obtaining of the headset equalizer profile comprising obtaining, by the processing system, the headset equalizer profile, from an information repository associated with a manufacturer of the headset.

* * * * *